United States Patent
Zhamu et al.

(10) Patent No.: US 10,862,157 B2
(45) Date of Patent: *Dec. 8, 2020

(54) ALKALI METAL-SULFUR SECONDARY BATTERY CONTAINING A CONDUCTIVE ELECTRODE-PROTECTING LAYER

(71) Applicant: Global Graphene Group, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/010,965

(22) Filed: Jun. 18, 2018

(65) Prior Publication Data
US 2019/0386332 A1    Dec. 19, 2019

(51) Int. Cl.
*H01M 10/052* (2010.01)
*H01M 10/39* (2006.01)
(Continued)

(52) U.S. Cl.
CPC ............ *H01M 10/052* (2013.01); *H01M 2/14* (2013.01); *H01M 4/134* (2013.01); *H01M 4/386* (2013.01);
(Continued)

(58) Field of Classification Search
None
See application file for complete search history.

(56) References Cited

U.S. PATENT DOCUMENTS 2,798,878 A  7/1957  Hummers
3,836,511 A  9/1974  O'farrell et al.
(Continued)

FOREIGN PATENT DOCUMENTS

CN    103258990 A    8/2013
CN    105322132 A    2/2016
(Continued)

OTHER PUBLICATIONS

An et al., "Diameter-Selected Synthesis of Single Crystalline Trigonal Selenium Nanowires" Materials Chemistry and Physics (2007) vol. 101, No. 2-3, pp. 357-361.
(Continued)

*Primary Examiner* — Wyatt P McConnell

(57) ABSTRACT

Provided is a rechargeable alkali metal-sulfur cell comprising an anode layer, an electrolyte and a porous separator, a cathode layer, and a discrete anode-protecting layer disposed between the anode layer and the separator and/or a discrete cathode-protecting layer disposed between the separator and the cathode active material layer; wherein the anode-protecting layer or cathode-protecting layer comprises a conductive sulfonated elastomer composite having from 0.01% to 50% by weight of a conductive reinforcement material dispersed in a sulfonated elastomeric matrix material and the protective layer has a thickness from 1 nm to 50 μm, a fully recoverable tensile strain from 2% to 500%, a lithium ion conductivity from $10^{-7}$ S/cm to $5 \times 10^{-2}$ S/cm, and an electrical conductivity from $10^{-7}$ S/cm to 100 S/cm. This battery exhibits an excellent combination of high sulfur content, high sulfur utilization efficiency, high energy density, and long cycle life.

23 Claims, 7 Drawing Sheets

(51) Int. Cl.
  *H01M 2/14* (2006.01)
  *H01M 10/056* (2010.01)
  *H01M 4/38* (2006.01)
  *H01M 4/505* (2010.01)
  *H01M 4/66* (2006.01)
  *H01M 4/58* (2010.01)
  *H01M 4/134* (2010.01)
  *H01M 4/583* (2010.01)
  *H01M 4/02* (2006.01)

(52) U.S. Cl.
  CPC ........... *H01M 4/505* (2013.01); *H01M 4/583* (2013.01); *H01M 4/5815* (2013.01); *H01M 4/661* (2013.01); *H01M 10/056* (2013.01); *H01M 10/3909* (2013.01); *H01M 2004/027* (2013.01); *H01M 2004/028* (2013.01)

(56) References Cited

U.S. PATENT DOCUMENTS

| | | |
|---|---|---|
| 4,720,910 A | 1/1988 | Rourke et al. |
| 5,057,339 A | 10/1991 | Ogawa |
| 5,270,417 A | 12/1993 | Soga et al. |
| 5,342,710 A | 8/1994 | Koksbang |
| 5,350,647 A | 9/1994 | Hope et al. |
| 5,409,785 A | 4/1995 | Nakano et al. |
| 5,424,151 A | 6/1995 | Koksbang et al. |
| 5,434,021 A | 7/1995 | Fauteux et al. |
| 5,460,905 A | 10/1995 | Skotheim |
| 5,536,599 A | 7/1996 | Alamgir et al. |
| 5,648,187 A | 7/1997 | Skotheim |
| 5,961,672 A | 10/1999 | Skotheim et al. |
| 6,025,094 A | 2/2000 | Visco et al. |
| 6,447,952 B1 | 9/2002 | Spiegel et al. |
| 6,451,484 B1 | 9/2002 | Han et al. |
| 6,475,678 B1 | 11/2002 | Suzuki |
| 6,515,101 B1 | 2/2003 | Sheares |
| 6,620,547 B1 | 9/2003 | Sung et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,618,678 B2 | 11/2009 | Mao et al. |
| 8,597,828 B2 | 12/2013 | Martinet et al. |
| 9,905,856 B1 | 2/2018 | Zhamu et al. |
| 10,084,182 B2 | 9/2018 | Pan et al. |
| 10,483,533 B2 | 11/2019 | Zhamu et al. |
| 2002/0182488 A1 | 12/2002 | Cho et al. |
| 2002/0195591 A1 | 12/2002 | Ravet et al. |
| 2003/0180619 A1 | 9/2003 | Tamura et al. |
| 2004/0018430 A1 | 1/2004 | Holman et al. |
| 2005/0034993 A1 | 2/2005 | Gozdz et al. |
| 2005/0098914 A1 | 5/2005 | Varma et al. |
| 2005/0118508 A1 | 6/2005 | Yong et al. |
| 2005/0136330 A1 | 6/2005 | Mao et al. |
| 2007/0218369 A1 | 9/2007 | Kaiduka et al. |
| 2007/0289879 A1 | 12/2007 | Horton |
| 2008/0248393 A1 | 10/2008 | Richard et al. |
| 2008/0318128 A1 | 12/2008 | Simoneau et al. |
| 2009/0155676 A1 | 6/2009 | Zhamu et al. |
| 2009/0169725 A1 | 7/2009 | Zhamu et al. |
| 2010/0099029 A1 | 4/2010 | Kinoshita et al. |
| 2010/0112454 A1 | 5/2010 | Visco et al. |
| 2010/0143798 A1 | 6/2010 | Zhamu et al. |
| 2010/0173198 A1 | 7/2010 | Zhamu et al. |
| 2011/0059361 A1 | 3/2011 | Wilkening et al. |
| 2011/0104571 A1 | 5/2011 | Zhamu et al. |
| 2011/0143211 A1 | 6/2011 | Takeyama |
| 2011/0177388 A1 | 7/2011 | Bae et al. |
| 2011/0244337 A1 | 10/2011 | Ohta et al. |
| 2011/0262816 A1 | 10/2011 | Amatucci |
| 2012/0064409 A1 | 3/2012 | Zhamu et al. |
| 2012/0070708 A1 | 3/2012 | Ohira et al. |
| 2012/0088154 A1 | 4/2012 | Liu et al. |
| 2013/0052544 A1 | 2/2013 | Ohkubo et al. |
| 2013/0054061 A1 | 2/2013 | Nishimoto |
| 2013/0157141 A1 | 6/2013 | Zhong et al. |
| 2013/0164615 A1 | 6/2013 | Manthiram et al. |
| 2013/0171339 A1 | 7/2013 | Wang et al. |
| 2013/0224603 A1 | 8/2013 | Chen et al. |
| 2013/0292613 A1 | 11/2013 | Wegner et al. |
| 2014/0072879 A1 | 3/2014 | Chen et al. |
| 2014/0147738 A1 | 5/2014 | Chen et al. |
| 2014/0147751 A1 | 5/2014 | Yang et al. |
| 2014/0154572 A1 | 6/2014 | Singh et al. |
| 2014/0162121 A1 | 6/2014 | Ryu et al. |
| 2014/0178747 A1 | 6/2014 | Tsai et al. |
| 2014/0234702 A1 | 8/2014 | Zhang et al. |
| 2014/0235513 A1 | 8/2014 | Kverel et al. |
| 2014/0363746 A1 | 12/2014 | He et al. |
| 2015/0044556 A1 | 2/2015 | Wang et al. |
| 2015/0064568 A1 | 3/2015 | Yushin et al. |
| 2015/0064574 A1 | 3/2015 | He et al. |
| 2015/0079485 A1 | 3/2015 | Choi et al. |
| 2015/0180000 A1 | 6/2015 | Roumi |
| 2015/0180037 A1 | 6/2015 | Gronwald et al. |
| 2015/0218323 A1 | 8/2015 | Kim et al. |
| 2015/0221935 A1 | 8/2015 | Zhou et al. |
| 2015/0236372 A1 | 8/2015 | Yushin et al. |
| 2015/0244025 A1 | 8/2015 | Rhee et al. |
| 2015/0318532 A1 | 11/2015 | Manthiram et al. |
| 2015/0325844 A1 | 11/2015 | Inoue |
| 2015/0372294 A1 | 12/2015 | Minami et al. |
| 2016/0013481 A1 | 1/2016 | Jeong et al. |
| 2016/0043384 A1 | 2/2016 | Zhamu et al. |
| 2016/0087266 A1 | 3/2016 | Muldoon et al. |
| 2016/0126543 A1 | 5/2016 | Ota et al. |
| 2016/0149216 A1 | 5/2016 | Mizuno et al. |
| 2016/0181611 A1 | 6/2016 | Cho et al. |
| 2016/0218341 A1 | 7/2016 | Kumar et al. |
| 2016/0240896 A1 | 8/2016 | Zhang et al. |
| 2016/0301075 A1 | 10/2016 | Zhamu et al. |
| 2016/0344035 A1 | 11/2016 | Zhamu et al. |
| 2016/0351877 A1 | 12/2016 | Kusachi et al. |
| 2016/0351909 A1 | 12/2016 | Bittner et al. |
| 2016/0372743 A1 | 12/2016 | Cho et al. |
| 2016/0372784 A1 | 12/2016 | Hayner et al. |
| 2017/0002154 A1 | 1/2017 | Hiasa et al. |
| 2017/0018799 A1 | 1/2017 | Jeong |
| 2017/0033357 A1 | 2/2017 | Cho et al. |
| 2017/0047584 A1 | 2/2017 | Hwang et al. |
| 2017/0062830 A1 | 3/2017 | Bao et al. |
| 2017/0092986 A1 | 3/2017 | Ogawa et al. |
| 2017/0098824 A1 | 4/2017 | Fasching et al. |
| 2017/0098856 A1 | 4/2017 | Zhamu et al. |
| 2017/0104204 A1 | 4/2017 | Zhamu et al. |
| 2017/0104217 A1 | 4/2017 | Yu et al. |
| 2017/0117535 A1 | 4/2017 | Yoon et al. |
| 2017/0117538 A1 | 4/2017 | Bendimerad |
| 2017/0117589 A1 | 4/2017 | Tajima et al. |
| 2017/0141387 A1 | 5/2017 | Hayner et al. |
| 2017/0141399 A1 | 5/2017 | Lux et al. |
| 2017/0166722 A1 | 6/2017 | Zhamu et al. |
| 2017/0179468 A1 | 6/2017 | Fanous et al. |
| 2017/0194640 A1 | 7/2017 | Bucur et al. |
| 2017/0194648 A1 | 7/2017 | Bucur et al. |
| 2017/0200943 A1 | 7/2017 | Kawakami |
| 2017/0207484 A1 | 7/2017 | Zhamu et al. |
| 2017/0288211 A1 | 10/2017 | Zhamu et al. |
| 2017/0294643 A1 | 10/2017 | Burshtain et al. |
| 2017/0309917 A1 | 10/2017 | Lee et al. |
| 2017/0338472 A1 | 11/2017 | Zhamu et al. |
| 2017/0338474 A1 | 11/2017 | Lee et al. |
| 2017/0338490 A1 | 11/2017 | Xiao et al. |
| 2018/0053978 A1 | 2/2018 | Song et al. |
| 2018/0083265 A1 | 3/2018 | Singh et al. |
| 2018/0219215 A1 | 8/2018 | Bucur et al. |
| 2018/0233736 A1 | 8/2018 | Zhamu et al. |
| 2018/0241031 A1 | 8/2018 | Pan et al. |
| 2018/0241032 A1 | 8/2018 | Pan et al. |

(56) References Cited

U.S. PATENT DOCUMENTS

| | | | |
|---|---|---|---|
| 2018/0248173 | A1 | 8/2018 | Pan et al. |
| 2018/0277913 | A1 | 9/2018 | Pan et al. |
| 2018/0287142 | A1 | 10/2018 | Zhamu et al. |
| 2018/0294475 | A1 | 10/2018 | Zhamu et al. |
| 2018/0294476 | A1 | 10/2018 | Zhamu et al. |
| 2018/0301707 | A1 | 10/2018 | Pan et al. |
| 2019/0051905 | A1 | 2/2019 | Zhamu et al. |
| 2019/0058185 | A1 | 2/2019 | Lee et al. |
| 2019/0077669 | A1 | 3/2019 | Zhamu et al. |
| 2019/0088958 | A1 | 3/2019 | Viner et al. |
| 2019/0260028 | A1 | 8/2019 | Zhamu et al. |
| 2019/0319303 | A1 | 10/2019 | Kushida et al. |
| 2019/0386332 | A1 | 12/2019 | Zhamu et al. |
| 2019/0393466 | A1 | 12/2019 | Lin et al. |
| 2019/0393495 | A1 | 12/2019 | He et al. |
| 2019/0393510 | A1 | 12/2019 | He et al. |
| 2019/0393543 | A1 | 12/2019 | Zhamu et al. |

FOREIGN PATENT DOCUMENTS

| | | | |
|---|---|---|---|
| CN | 108899472 | A | 11/2018 |
| EP | 2787563 | A1 | 10/2014 |
| JP | 1275613 | A | 11/1989 |
| JP | 2010160984 | A | 7/2010 |
| JP | 2011524611 | A | 9/2011 |
| JP | 2015084320 | A | 4/2015 |
| JP | 2015176656 | A | 10/2015 |
| KR | 1020030050475 | A | 6/2003 |
| KR | 100670527 | B1 | 1/2007 |
| KR | 1020100138607 | A | 12/2010 |
| KR | 1020140101640 | A | 8/2014 |
| KR | 20160052351 | A | 5/2016 |
| KR | 1020160085386 | A | 7/2016 |
| KR | 1020160087511 | A | 7/2016 |
| KR | 1020170001069 | U | 3/2017 |
| KR | 1020170086003 | A | 7/2017 |
| KR | 1020170126404 | A | 11/2017 |
| KR | 1020180035752 | A | 4/2018 |
| WO | 2007108424 | A1 | 9/2007 |
| WO | 2015141799 | A1 | 9/2015 |
| WO | 2016015915 | A1 | 2/2016 |
| WO | 2017172104 | A1 | 10/2017 |
| WO | 2017200798 | A1 | 11/2017 |
| WO | 2018075538 | A1 | 4/2018 |
| WO | 2018148090 | A1 | 8/2018 |

OTHER PUBLICATIONS

An et al., "Large-Scale Synthesis of High Quality Trigonal Selenium Nanowires" European Journal of Inorganic Chemistry (2003) vol. 17, pp. 3250-3255.
Arai et al., "Versatile supramolecular cross-linker: a rotaxane cross-linker that directly endows vinyl polymers with movable cross-links" Chemistry (2013) vol. 19, pp. 5917-5923.
Buonerba et al., "Novel Synthetic Strategy for the Sulfonation of Polybutadiene and Styrene-Butadiene Copolymers" Macromolecules (2013) vol. 46, pp. 778-784.
Chen et al., "Selenium nanowires and nanotubes synthesized via a facile template-free solution method" Materials Research Bulletin (2010) vol. 45, pp. 699-704.
Dwivedi et al., "An Organic Acid-induced Synthesis and Characterization of Selenium Nanoparticles" Journal of Nanotechnology (2011) Article ID 651971, 6 pages.
Fan et al., "Hollow selenium encapsulated into 3D graphene hydrogels for lithium-selenium batteries with high rate performance and cycling stability" RSC Adv. (2017) vol. 7, pp. 21281-21286.
Gao et al., "Hollow Sphere Selenium Nanoparticles: Their In-Vitro Anti Hydroxyl Radical Effect" Advanced Materials (2002), vol. 14, No. 4, pp. 290-293.
Ji et al., "A highly ordered nanostructured carbon-sulphur cathode for lithium-sulphur batteries" Nature Materials (2009) vol. 8, pp. 500-506.
Karlicky et al., "Halogenated Graphenes: Rapidly Growing Family of Graphene Derivatives" ACS Nano (2013) vol. 7, No. 8, pp. 6434-6464.
Li et al., "Mixed Surfactant Template Method for Preparation of Nanometer Selenium" E-Journal of Chemistry (2009) vol. 6, No. S1, pp. S304-S310.
Lin et al., "Observation in the Growth of Selenium Nanoparticles" Journal of Chinese Chemical Society (2004) vol. 51, No. 2, pp. 239-242.
Luesakul et al., "Shape-controlled synthesis of cubic-like selenium nanoparticles via the self-assembly method" Carbohydrate Polymers (2016) vol. 153, pp. 435-444.
PCT/US17/18452 International Search Report and Written Opinion dated Apr. 25, 2017, 9 pages.
PCT/US18/16404 International Search Report and Written Opinion dated Apr. 13, 2018, 11 pages.
PCT/US18/16410 International Search Report and Written Opinion dated Apr. 20, 2018, 10 pages.
PCT/US18/16418 International Search Report and Written Opinion dated Apr. 25, 2018, 9 pages.
PCT/US18/16423 International Search Report and Written Opinion dated Apr. 24, 2018, 9 pages.
PCT/US18/16426 International Search Report and Written Opinion dated Apr. 24, 2018, 9 pages.
PCT/US18/16431 International Search Report and Written Opinion dated Apr. 26, 2018, 6 pages.
PCT/US18/20892 International Search Report and Written Opinion dated May 2, 2018, 6 pages.
Zeng et al., "Solvothermal synthesis of trigonal selenium with butterfly-like microstructure" Particuology (2013) vol. 11, No. 5, pp. 614-617.
Zhang et al., "Synthesis of selenium nanoparticles in the presence of polysaccharides" Materials Letters (2004) vol. 58, No. 21, pp. 2590-2594.
Elabd et al., "Sulfonation and Characterization of Poly(styrene-isobutylene-styrene) Triblock Copolymers at High Ion-Exchange Capacities" Polymer (2004) vol. 45, pp. 3037-3043.
Xie et al., "A Novel Method for Synthesis of Sulfonated SBS Ionomers by Ring-Opening Reaction of Epoxidized SBS, Their Characterization, Properties, and Blends" Journal of Elastomers and Plastics (2007) vol. 39, pp. 317-334.
Choi et al., "Highly elastic binders integrating polyrotaxanes for silicon microparticle anodes in lithium ion batteries" Science (2017) vol. 357, No. 6348, pp. 279-283.
Habib et al., "Elastomeric Nanocomposite Based on Exfoliated Graphene Oxide and Its Characteristics without Vulcanization" Hindawi Journal of Nanomaterials (2017) vol. 2017, Article ID 8543137, 11 pages.
KR 10-2015-0044333 English language translation.
Liu et al., "Solutions for the problems of silicon-carbon anode materials for lithium-ion batteries" Royal Society Open Science (2018) vol. 5, p. 172370.
PCT/US18/25135 International Search Report and Written Opinion dated Jun. 27, 2018, 14 pages.
PCT/US18/25150 International Search Report and Written Opinion dated Jun. 29, 2018, 14 pages.
PCT/US18/25160 International Search Report and Written Opinion dated Nov. 21, 2018, 12 pages.
PCT/US18/25163 International Search Report and Written Opinion dated Jul. 27, 2018, 19 pages.
PCT/US18/43421 International Search Report and Written Opinion dated Oct. 11, 2018, 13 pages.
PCT/US18/43435 International Search Report and Written Opinion dated Jan. 7, 2019, 14 pages.
PCT/US19/18931 International Search Report and Written Opinion dated May 8, 2019, 13 pages.
PCT/US19/19061 International Search Report and Written Opinion dated May 13, 2019, 11 pages.
PCT/US19/19062 International Search Report and Written Opinion dated May 13, 2019, 9 pages.
PCT/US19/20214 International Search Report and Written Opinion dated May 2, 2019, 7 pages.

(56) References Cited

OTHER PUBLICATIONS

PCT/US19/20222 International Search Report and Written Opinion dated May 3, 2019, 7 pages.
PCT/US19/21137 International Search Report and Written Opinion dated Jun. 18, 2019, 13 pages.
U.S. Appl. No. 14/999,080 Nonfinal Office Action dated Nov. 9, 2018.
U.S. Appl. No. 15/442,803 Nonfinal Office Action dated Dec. 28, 2018, 24 pages.
U.S. Appl. No. 15/442,807 Nonfinal Office Action dated Dec. 14, 2018, 7 pages.
U.S. Appl. No. 15/483,342 Final Office Action dated Mar. 22, 2019, 52 pages.
U.S. Appl. No. 15/483,342 Nonfinal Office Action dated Nov. 2, 2018, 37 pages.
U.S. Appl. No. 15/483,347 Final Office Action dated Apr. 16, 2019, 23 pages.
U.S. Appl. No. 15/483,347 Nonfinal Office Action dated Nov. 2, 2018, 20 pages.
U.S. Appl. No. 15/483,348 Final Office Action dated Apr. 9, 2019, 28 pages.
U.S. Appl. No. 15/483,348 Nonfinal Office Action dated Nov. 21, 2018, 22 pages.
U.S. Appl. No. 15/901,367 Nonfinal Office Action dated Jun. 10, 2019, 12 pages.
Vaikhanski et al., "Fiber-reinforced composite foam from expandable PVC microspheres" Composites Part A (2003) vol. 34, pp. 1245-1253.
Wikipedia contributors. "Anode." Wikipedia, The Free Encyclopedia, Mar. 4, 2019, Web. Mar. 18, 2019. (Year: 2019).
Wikipedia contributors. "Molar mass distribution." Wikipedia, The Free Encyclopedia, Feb. 1, 2019, Web. Mar. 18, 2019. (Year: 2019).
U.S. Appl. No. 16/014,623 Nonfinal Office Action dated Oct. 4, 2019, 8 pages.
U.S. Appl. No. 16/017,294 Nonfinal Office Action dated Jan. 23, 2020, 6 pages.
U.S. Appl. No. 16/112,208 Nonfinal Office Action dated Apr. 2, 2020, 7 pages.
U.S. Appl. No. 16/112,225 Nonfinal Office Action dated May 13, 2020, 9 pages.
U.S. Appl. No. 16/113,676 Nonfinal Office Action dated Oct. 4, 2019, 9 pages.
U.S. Appl. No. 16/113/676 Final Office Action dated Apr. 9, 2020, 15 pages.
U.S. Appl. No. 16/116,329 Nonfinal Office Action dated Mar. 30, 2020, 6 pages.
U.S. Appl. No. 16/116,341 Nonfinal Office Action dated Mar. 30, 2020, 6 pages.
U.S. Appl. No. 16/120,875 Final Office Action dated Apr. 9, 2020, 14 pages.
U.S. Appl. No. 16/120,875 Nonfinal Office Action dated Oct. 4, 2019, 10 pages.
U.S. Appl. No. 16/123,218 Final Office Action dated Apr. 9, 2020, 13 pages.
U.S. Appl. No. 16/123,218 Nonfinal Office Action dated Oct. 4, 2019, 9 pages.
U.S. Appl. No. 16/126,736 Nonfinal Office Action dated Mar. 30, 2020, 6 pages.
U.S. Appl. No. 16/126,745 Nonfinal Office Action dated Mar. 30, 2020, 6 pages.
U.S. Appl. No. 16/160,257 Nonfinal Office Action dated Apr. 3, 2020, 16 pages.
U.S. Appl. No. 16/166,536 Nonfinal Office Action dated May 14, 2020, 5 pages.
U.S. Appl. No. 16/166,574 Final Office Action dated Apr. 9, 2020, 12 pages.
U.S. Appl. No. 16/166,574 Nonfinal Office Action dated Oct. 4, 2019, 9 pages.
U.S. Appl. No. 16/238,052 Nonfinal Office Action dated Apr. 3, 2020, 14 pages.
U.S. Appl. No. 16/256,346 Nonfinal Office Action dated May 19, 2020, 16 pages.
"Nylon" en.wikipedia.org/wiki/Nylon. Accessed Feb. 18, 2020 (Year: 2020).
Azo Materials Table of Properties on Styrene Butadiene Rubber, 5 pages.
PCT/US19/27147 International Search Report and Written Opinion dated Aug. 1, 2019, 16 pages.
PCT/US19/36748 International Search Report and Written Opinion dated Oct. 16, 2019, 11 pages.
PCT/US19/37690 International Search Report and Written Opinion dated Oct. 18, 2019, 18 pages.
PCT/US19/37692 International Search Report and Written Opinion dated Oct. 21, 2019, 18 pages.
PCT/US19/37700 International Search Report and Written Opinion dated Oct. 23, 2019, 17 pages.
PCT/US19/38367 International Search Report and Written Opinion dated Oct. 18, 2019, 17 pages.
PCT/US19/38368 International Search Report and Written Opinion dated Oct. 18, 2019, 18 pages.
PCT/US19/38436 International Search Report and Written Opinion dated Oct. 16, 2019, 17 pages.
PCT/US19/38455 International Search Report and Written Opinion dated Oct. 18, 2019, 10 pages.
PCT/US19/38456 International Search Report and Written Opinion dated Oct. 16, 2019, 16 pages.
PCT/US19/38881 International Search Report and Written Opinion dated Oct. 18, 2019, 14 pages.
PCT/US19/47642 International Search Report and Written Opinion dated Dec. 6, 2019, 16 pages.
PCT/US19/48084 International Search Report and Written Opinion dated Dec. 16, 2019, 9 pages.
PCT/US19/55758 International Search Report and Written Opinion dated Jan. 31, 2020, 15 pages.
PCT/US20/14869 International Search Report and Written Opinion dated May 19, 2020, 13 pages.
U.S. Appl. No. 14/999,080 Nonfinal Office Action dated Oct. 30, 2019, 15 pages.
U.S. Appl. No. 15/434,632 Final Office Action dated Dec. 26, 2019, 20 pages.
U.S. Appl. No. 15/434,632 Nonfinal Office Action dated Jun. 26, 2020, 19 pages.
U.S. Appl. No. 15/442,278 Final Office Action dated Oct. 21, 2019, 16 pages.
U.S. Appl. No. 15/442,278 Nonfinal Office Action dated Feb. 28, 2020, 16 pages.
U.S. Appl. No. 15/442,803 Final Office Action dated Feb. 24, 2020, 36 pages.
U.S. Appl. No. 15/442,803 Nonfinal Office Action dated Jul. 20, 2020, 8 pages.
U.S. Appl. No. 15/442,803 Nonfinal Office Action dated Jul. 25, 2019, 37 pages.
U.S. Appl. No. 15/478,125 Final Office Action dated Aug. 23, 2019, 14 pages.
U.S. Appl. No. 15/478,125 Nonfinal Office Action dated Mar. 5, 2020, 11 pages.
U.S. Appl. No. 15/483,347 Final Office Action dated Dec. 27, 2019, 22 pages.
U.S. Appl. No. 15/483,347 Nonfinal Office Action dated Jun. 17, 2020, 14 pages.
U.S. Appl. No. 15/483,347 Nonfinal Office Action dated Sep. 17, 2019, 20 pages.
U.S. Appl. No. 15/483,348 Advisory Action dated Jul. 18, 2019, 9 pages.
U.S. Appl. No. 15/483,348 Final Office Action dated Jan. 20, 2020, 9 pages.
U.S. Appl. No. 15/483,348 Nonfinal Office Action dated Sep. 16, 2019, 22 pages.
U.S. Appl. No. 15/485,934 Nonfinal Office Action dated May 26, 2020, 12 pages.
U.S. Appl. No. 15/676,677 Nonfinal Office Action dated Feb. 5, 2020, 15 pages.

(56) References Cited

OTHER PUBLICATIONS

U.S. Appl. No. 15/676,680 Nonfinal Office Action dated May 20, 2020, 8 pages.
U.S. Appl. No. 15/903,788 Nonfinal Office Action dated Jun. 4, 2020, 11 pages.
U.S. Appl. No. 15/903,808 Final Office Action dated May 15, 2020, 9 pages.
U.S. Appl. No. 15/903,808 Nonfinal Office Action dated Jan. 28, 2020, 8 pages.
U.S. Appl. No. 15/910,465 Final Office Action dated May 15, 2020, 13 pages.
U.S. Appl. No. 15/910,465 Nonfinal Office Action dated Nov. 1, 2019, 12 pages.
U.S. Appl. No. 15/910,471 Nonfinal Office Action dated May 13, 2020, 11 pages.
U.S. Appl. No. 15/910,471 Non-final Office Action dated Nov. 8, 2019, 12 pages.
U.S. Appl. No. 15/914,216 Final Office Action dated Dec. 19, 2019, 9 pages.
U.S. Appl. No. 15/954,088 Nonfinal Office Action dated Mar. 13, 2020, 9 pages.
U.S. Appl. No. 16/010,213 Nonfinal Office Action dated Mar. 27, 2020, 12 pages.
U.S. Appl. No. 16/010,225 Final Office Action dated Jul. 8, 2020, 7 pages.
U.S. Appl. No. 16/010,225 Nonfinal Office Action dated Mar. 27, 2020, 13 pages.
U.S. Appl. No. 16/010,975 Nonfinal Office Action dated Jan. 8, 2020, 5 pages.
U.S. Appl. No. 16/014,623 Final Office Action dated Apr. 9, 2020, 14 pages.

ALKALI METAL-SULFUR SECONDARY BATTERY CONTAINING A CONDUCTIVE ELECTRODE-PROTECTING LAYER

STATEMENT REGARDING FEDERALLY SPONSORED RESEARCH OR DEVELOPMENT

The research described herein was supported in part by finds from the U.S. Government (Department of Defense), and the U.S. Government may, therefore, have certain rights in the invention(s) described herein.

FIELD OF THE INVENTION

The present invention provides a protective layer for use in a secondary or rechargeable alkali metal-sulfur battery, including the lithium-sulfur battery, sodium-sulfur battery, and potassium-sulfur battery.

BACKGROUND

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8+16Li \leftrightarrow 8Li_2S$ that lies near 2.2 V with respect to $Li^+/Li^0$. This electrochemical potential is approximately ⅔ of that exhibited by conventional positive electrodes (e.g. $LiMnO_4$). However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/l, respectively, based on the combined Li and S weight or volume. If based on the total cell weight or volume, the energy densities of optimally designed Li—S cell configurations can reach approximately 1,000 Wh/kg and 1,100 Wh/l, respectively. However, the current Li-sulfur cells reported by industry leaders in sulfur cathode technology have a maximum cell specific energy of 250-400 Wh/kg (based on the total cell weight), which is far below what is possible.

In summary, despite its considerable advantages, the Li—S cell is plagued with several major technical:

(1) Conventional lithium metal cells still have dendrite formation and related internal shorting issues.
(2) Sulfur or sulfur-containing organic compounds are highly insulating, both electrically and ionically. To enable a reversible electrochemical reaction at high current densities or charge/discharge rates, the sulfur must maintain intimate contact with an electrically conductive additive. Various carbon-sulfur composites have been utilized for this purpose, but only with limited success owing to the limited scale of the contact area. Typical reported capacities are between 300 and 550 mAh/g (based on the cathode carbon-sulfur composite weight) at moderate rates.
(3) The cell tends to exhibit significant capacity decay during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator to the Li negative electrode whereupon they are reduced to solid precipitates ($Li_2S_2$ and/or $Li_2S$), causing active mass loss. In addition, the solid product that precipitates on the surface of the positive electrode during discharge becomes electrochemically irreversible, which also contributes to active mass loss.
(4) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications. Despite the various approaches proposed for the fabrication of high energy density Li—S cells, there remains a need for cathode materials, production processes, and cell operation methods that retard the out-diffusion of S or lithium polysulfide from the cathode compartments into other components in these cells, improve the utilization of electro-active cathode materials (S utilization efficiency), and provide rechargeable Li—S cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-sulfur secondary battery if dendrite related issues could be addressed.

Sodium metal (Na) and potassium metal (K) have similar chemical characteristics to Li and the sulfur cathode in room temperature sodium-sulfur cells (RT Na—S batteries) or potassium-sulfur cells (K—S) face the same issues observed in Li—S batteries, such as: (i) low active material utilization rate, (ii) poor cycle life, and (iii) low Coulombic efficiency. Again, these drawbacks arise mainly from insulating nature of S, dissolution of S and Na or K polysulfide intermediates in liquid electrolytes (and related Shuttle effect), and large volume change during charge/discharge.

Hence, an object of the present invention is to provide a rechargeable alkali metal battery (e.g., Li—S, Na—S, and K—S battery) that exhibits an exceptionally high specific energy or high energy density. One particular technical goal of the present invention is to provide an alkali metal-sulfur or alkali ion-sulfur cell with a cell specific energy greater than 400 Wh/kg, preferably greater than 500 Wh/kg, and more preferably greater than 600 Wh/kg (all based on the total cell weight).

Another object of the present invention is to provide an alkali metal-sulfur cell that exhibits a high cathode specific capacity (higher than 1,200 mAh/g based on the sulfur weight, or higher than 1,000 mAh/g based on the cathode composite weight, including sulfur, conducting additive or substrate, and binder weights combined, but excluding the weight of cathode current collector). The specific capacity is preferably higher than 1,400 mAh/g based on the sulfur weight alone or higher than 1,200 mAh/g based on the cathode composite weight. This must be accompanied by a high specific energy, good resistance to dendrite formation, and a long and stable cycle life.

It may be noted that in most of the open literature reports (scientific papers) and patent documents, scientists or inventors choose to express the cathode specific capacity based on the sulfur or lithium polysulfide weight alone (not the total cathode composite weight), but unfortunately a large proportion of non-active materials (those not capable of storing lithium, such as conductive additive and binder) is typically used in their Li—S cells. For practical use purposes, it is more meaningful to use the cathode composite weight-based capacity value.

A specific object of the present invention is to provide a rechargeable alkali metal-sulfur cell based on rational materials and battery designs that overcome or significantly reduce the following issues commonly associated with conventional Li—S and room temperature Na—S cells: (a) dendrite formation (internal shorting); (b) extremely low electric and ionic conductivities of sulfur, requiring large proportion (typically 30-55%) of non-active conductive fillers and having significant proportion of non-accessible or non-reachable sulfur or alkali metal polysulfides); (c) poor sulfur utilization efficiency; (d) dissolution of S and alkali metal polysulfide in electrolyte; (e) migration of alkali metal polysulfides from the cathode to the anode (which irreversibly react with Li, Na, or K at the anode), resulting in active material loss and capacity decay (the shuttle effect); and (f) short cycle life.

SUMMARY OF THE INVENTION

The present invention provides an alkali metal-sulfur cell (e.g. lithium-sulfur cell, sodium-sulfur cell, and potassium-sulfur cell). The lithium-sulfur battery can include the lithium metal-sulfur battery (having lithium metal as the anode active material and sulfur as the cathode active material) and the lithium ion-sulfur battery (e.g. prelithiated Si or graphite as the anode active material and sulfur as the cathode active material). The sodium-sulfur battery can include the sodium metal-sulfur battery (having sodium metal as the anode active material and sulfur as the cathode active material) and the sodium ion-sulfur battery (e.g. hard carbon as the anode active material and sulfur as the cathode active material).

In some embodiments, the alkali metal-sulfur cell (selected from lithium-sulfur cell, sodium-sulfur cell, or potassium-sulfur cell, said alkali metal-sulfur cell) comprises: (a) an anode active material layer and an optional anode current collector supporting said anode active material layer; (b) a cathode active material layer, comprising a sulfur-containing material selected from a sulfur-carbon hybrid, sulfur-graphite hybrid, sulfur-graphene hybrid, conducting polymer-sulfur hybrid, metal sulfide, sulfur compound, or a combination thereof, and an optional cathode current collector supporting said cathode active material layer; (c) an electrolyte and a porous separator layer; and (d) a discrete anode-protecting layer disposed between the anode active material layer and the porous separator and/or a discrete cathode-protecting layer disposed between the porous separator and the cathode active material layer; wherein the anode-protecting layer or cathode-protecting layer comprises a conductive sulfonated elastomer composite having from 0.01% to 50% by weight of a conductive reinforcement material dispersed in a sulfonated elastomeric matrix material and said layer of conductive sulfonated elastomer composite has a thickness from 1 nm to 100 μm, a fully recoverable tensile strain from 2% to 500%, a lithium ion conductivity from $10^{-7}$ S/cm to $5 \times 10^{-2}$ S/cm, and an electrical conductivity from $10^{-7}$ S/cm to 100 S/cm when measured at room temperature.

Preferably, the conductive reinforcement material is selected from graphene sheets, carbon nanotubes, carbon nanofibers, metal nanowires, conductive polymer fibers, or a combination thereof.

In some embodiments, the sulfonated elastomer composite preferably and more typically has a fully recoverable tensile strain from 5% to 300% (most typically from 10% to 150%), a thickness from 10 nm to 20 μm, a lithium ion conductivity of at least $10^{-5}$ S/cm, and an electrical conductivity of at least $10^{-3}$ S/cm when measured at room temperature on a cast thin film 20 μm thick.

Preferably, the sulfonated elastomeric matrix material contains a sulfonated version of an elastomer selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) (POE) elastomer, poly(ethylene-co-butene) (PBE) elastomer, styrene-ethylene-butadiene-styrene (SEBS) elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof. These sulfonated elastomers or rubbers, when present without graphene sheets, exhibit a high elasticity (having a fully recoverable tensile strain from 2% to 800%). In other words, they can be stretched up to 800% (8 times of the original length when under tension) and, upon release of the tensile stress, they can fully recover back to the original dimension. By adding from 0.01% to 50% by weight of a conductive reinforcement material and/or a lithium ion-conducting species dispersed in a sulfonated elastomeric matrix material, the fully recoverable tensile strains are typically reduced down to 2%-500% (more typically from 5% to 300% and most typically from 10% to 150%).

The conducting reinforcement material is preferably in a filamentary or sheet-like form, such as a nanotube, nanofiber, nanowire, nanoplatelet, or nanodisc. In some embodiments, the conductive reinforcement material is selected from graphene sheets, carbon nanotubes, carbon nanofibers, metal nanowires, conductive polymer fibers, or a combination thereof. These are electron-conducting materials and the sulfonated elastomer matrix is a lithium ion- and sodium ion-conducting material. By combining such a sulfonated elastomer and a conducting reinforcement, one obtains a composite that is both electron conducting and ion-conducting and capable of allowing electrons and lithium ions to migrate in and out of the particulate without much resistance.

The graphene sheets to be dispersed in a sulfonated elastomer matrix are preferably selected from pristine graphene, graphene oxide, reduced graphene oxide, graphene fluoride, graphene chloride, nitrogenated graphene, hydrogenated graphene, doped graphene, functionalized graphene, or a combination thereof. The graphene sheets preferably comprise single-layer graphene or few-layer graphene, wherein the few-layer graphene is defined as a graphene platelet formed of less than 10 graphene planes. The carbon nanotubes (CNTs) can be a single-walled CNT or multi-walled CNT. The carbon nanofibers may be vapor-grown carbon nanofibers or electrospinning based carbon nanofibers (e.g. electrospun polymer nanofibers that are subsequently carbonized).

The sulfur-carbon hybrid, sulfur-graphite hybrid, sulfur-graphene hybrid, or conducting polymer-sulfur hybrid may be a mixture, blend, composite, or chemically or physically bonded entity of sulfur or sulfide with a carbon, graphite, graphene, or conducting polymer material. For instance, a sulfur-graphene hybrid can be a simple mixture (in a particle form) of sulfur and graphene prepared by ball-milling. Such a hybrid can contain sulfur bonded on surfaces of a graphene oxide sheet, etc. As another example, the sulfur-carbon hybrid can be a simple mixture (in a particle form) of sulfur and carbon nanotubes, or can contain sulfur residing in pores of activated carbon particles.

In the rechargeable alkali metal-sulfur cell, the metal sulfide may contain a material denoted by $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M preferably is selected from Li, Na, K, Mg, Zn, Cu, Ti, Ni, Co, Fe, or Al.

In some preferred embodiments, the metal sulfide in the cathode layer contains $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S_1$, $K_2S_2$, $K_2S_3$, $K_2S_4$, $K_2S_5$, $K_2S_6$, $K_2S_7$, $K_2S_8$, $K_2S_9$, or $K_2S_{10}$.

In the rechargeable alkali metal-sulfur cell, the carbon or graphite material in the cathode active material layer may be selected from mesophase pitch, mesophase carbon, mesocarbon microbead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof. The graphene may be selected from pristine graphene, graphene oxide, reduced graphene oxide (RGO), graphene fluoride, nitrogenated graphene, hydrogenated graphene, doped graphene, functionalized graphene, or a combination thereof.

In certain embodiments, the sulfonated elastomer matrix further contains from 0.1% to 50% by weight of a lithium ion-conducting additive dispersed therein. In certain embodiments, the lithium ion-conducting may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

In certain embodiments, the lithium ion-conducting additive or sodium ion-conducting additive is selected from the following lithium salts or their sodium salt counterparts: lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium nitrate, $LiNO_3$, Li-fluoroalkyl-fhosphates, $LiPF_3(CF_2CF_3)_3$, lithium bisperfluoro-ethysulfonylimide, LiBETI, lithium bis(trifluoromethanesulfonyl)imide, lithium bis(fluorosulfonyl)imide, lithium trifluoromethanesulfonimide, LiTFSI, an ionic liquid-based lithium salt, or a combination thereof.

In certain preferred embodiments, the electron-conducting polymer in the conducting polymer-sulfur hybrid is selected from polyaniline, polypyrrole, polythiophene, polyfuran, a bi-cyclic polymer, a sulfonated derivative thereof, or a combination thereof.

In certain embodiments, the sulfonated elastomer matrix forms a mixture or blend with a lithium ion-conducting polymer selected from a lower molecular weight (<500,000 g/mole) version of poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof.

In some embodiments, the sulfonated elastomer has a lithium ion conductivity from $1\times10^{-5}$ S/cm to $5\times10^{-2}$ S/cm at room temperature.

The present invention enables the rechargeable alkali metal-sulfur cell to deliver a sulfur utilization efficiency from 80% to 99%, more typically from 85% to 97%.

In the rechargeable alkali metal-sulfur cell, the electrolyte is selected from polymer electrolyte, polymer gel electrolyte, composite electrolyte, ionic liquid electrolyte, aqueous electrolyte, organic liquid electrolyte, soft matter phase electrolyte, solid-state electrolyte, or a combination thereof. The electrolyte may contain a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

The electrolyte may contain a solvent selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

In certain embodiments, the anode active material layer of the invented cell contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof.

The rechargeable alkali metal-sulfur cell may be a lithium ion-sulfur cell and, in this case, the anode active material layer contains an anode active material selected from the group consisting of: (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof, (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof.

The rechargeable alkali metal-sulfur cell may be a sodium ion-sulfur cell or potassium ion-sulfur cell and, in this case, the anode active material layer contains an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, (d) Sodium or potassium salts; (e) particles of graphite, hard carbon, soft carbon or carbon particles and pre-sodiated versions thereof; and combinations thereof.

The invention also provides a method of extending the cycle-life of an alkali metal-sulfur cell. The method comprises implementing an anode-protecting layer between an anode active material layer and a porous separator/electrolyte, and/or implementing a cathode-protecting layer between a cathode active material and said porous separator/electrolyte, wherein the anode-protecting layer or cathode-protecting layer comprises a conductive sulfonated elastomer composite having from 0.01% to 50% by weight of a conductive reinforcement material dispersed in a sulfonated elastomeric matrix material and the layer of conductive sulfonated elastomer composite has a thickness from 1 nm to 100 μm, a fully recoverable tensile strain from 2% to 500%, a lithium ion conductivity from $10^{-7}$ S/cm to $5 \times 10^{-2}$ S/cm, and an electrical conductivity from $10^{-7}$ S/cm to 100 S/cm when measured at room temperature.

In some embodiments, the cathode active material layer comprises a sulfur-containing material selected from a sulfur-carbon hybrid, sulfur-graphite hybrid, sulfur-graphene hybrid, conducting polymer-sulfur hybrid, metal sulfide, sulfur compound, or a combination thereof. The sulfur-carbon hybrid, sulfur-graphite hybrid, sulfur-graphene hybrid, or conducting polymer-sulfur hybrid may be a mixture, blend, composite, chemically or physically bonded entity of sulfur or sulfide with a carbon, graphite, graphene, or conducting polymer material.

In some preferred embodiments, the conductive reinforcement material is selected from graphene sheets, carbon nanotubes, carbon nanofibers, metal nanowires, conductive polymer fibers, or a combination thereof.

The present invention also provides a method of manufacturing a rechargeable alkali metal-sulfur cell selected from a lithium-sulfur cell, sodium-sulfur cell, or potassium-sulfur cell. The method comprises: (a) providing an anode containing an anode active material layer and an optional anode current collector supporting the anode active material layer; (b) providing a cathode containing a cathode active material layer optionally supported on a cathode current collector; (c) providing a porous separator layer and an electrolyte and in ionic contact with the anode active material layer and the cathode active material layer; (d) implementing a layer of conductive sulfonated elastomer composite (the cathode-protecting layer) between the cathode active material layer and the separator and/or a layer of conductive sulfonated elastomer composite (the anode-protecting layer) between the anode active layer and the separator; and (e) combining the anode layer, the cathode layer, the electrolyte and separator layer, and the anode-protecting layer and/or the cathode-protecting layer together to form the alkali metal-sulfur cell.

In some embodiments, steps (d) and (e) may be conducted in the following manners:

1) by depositing a layer of first sulfonated elastomer composite onto one primary surface of the anode active material layer to form a protected anode and/or depositing a layer of second sulfonated elastomer composite onto one primary surface of the cathode active material layer to form a protected cathode, followed by combining the protected anode, the electrolyte/separator, and the protected cathode together to form the battery cell;

2) by depositing a layer of first sulfonated elastomer composite onto one primary surface of the separator and/or depositing a layer of second sulfonated elastomer composite onto the opposing primary surface of the separator to form a coated separator, followed by combining the anode, the coated separator, the cathode, and the electrolyte together to form the battery cell; or 3) by forming a layer of first sulfonated elastomer composite and/or a layer of second sulfonated elastomer composite, followed by laminating the anode layer, the layer of first sulfonated elastomer composite, the separator layer, the layer of second sulfonated elastomer composite, the cathode layer, along with the electrolyte to form the battery cell.

The cathode-protecting layer is implemented mainly for the purpose of reducing or eliminating the shuttling effect by preventing S or polysulfide from migrating out of the cathode zone and into the anode zone. More specifically, this layer acts to block the diffusion of any sulfur or metal polysulfide (e.g. lithium polysulfide or sodium polysulfide)

dissolved in the cathode from migrating to the anode side. This effectively reduces or eliminates the shuttling effect. This cathode-protecting layer, being highly elastic, also acts to maintain a good contact between the separator (if liquid or gel electrolyte is used) or the solid-state electrolyte and the cathode active material layer. Due to the large volume expansion/shrinkage of the S cathode, this elastic layer expands and shrinks congruently or conformably with the cathode active material layer, thereby preventing the formation of a gap between the separator (or solid-state electrolyte) and the cathode active material layer.

The anode-protecting layer implemented between the anode active layer and the separator (or the solid-state electrolyte) is mainly for the purpose of reducing or eliminating the alkali metal dendrite by providing a more stable alkali metal-electrolyte interface that is more conducive to uniform deposition of alkali metal during battery charges. This anode-protecting layer also acts to block the penetration of any dendrite, once initiated, from reaching the separator or cathode. This anode-protecting layer, being highly elastic, also can shrink or expands responsive the thickness increase or decrease of the anode active material layer.

It is advantageous to implement both an anode-protecting layer and a cathode-protecting layer in the same alkali metal-sulfur cell.

These and other advantages and features of the present invention will become more transparent with the description of the following best mode practice and illustrative examples.

DETAILED DESCRIPTION OF PREFERRED EMBODIMENTS

Figure 1A:
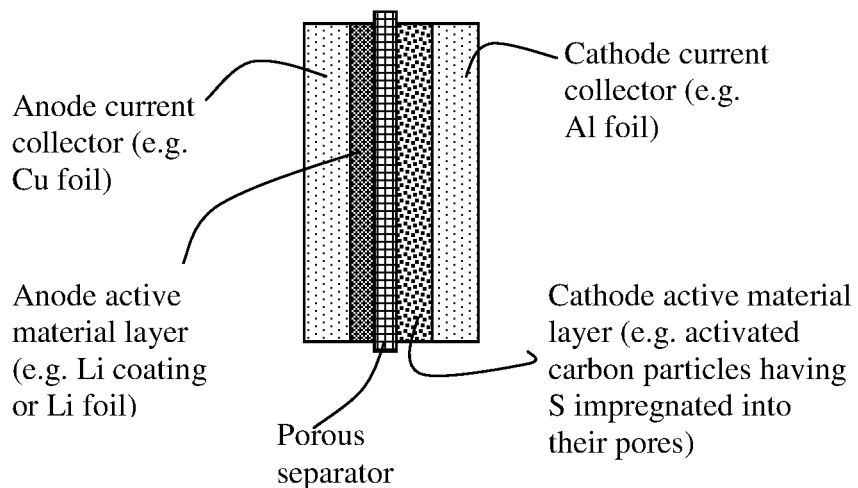
FIG. 1(A) Schematic of a prior art alkali metal-sulfur battery cell.
Figure 1B:
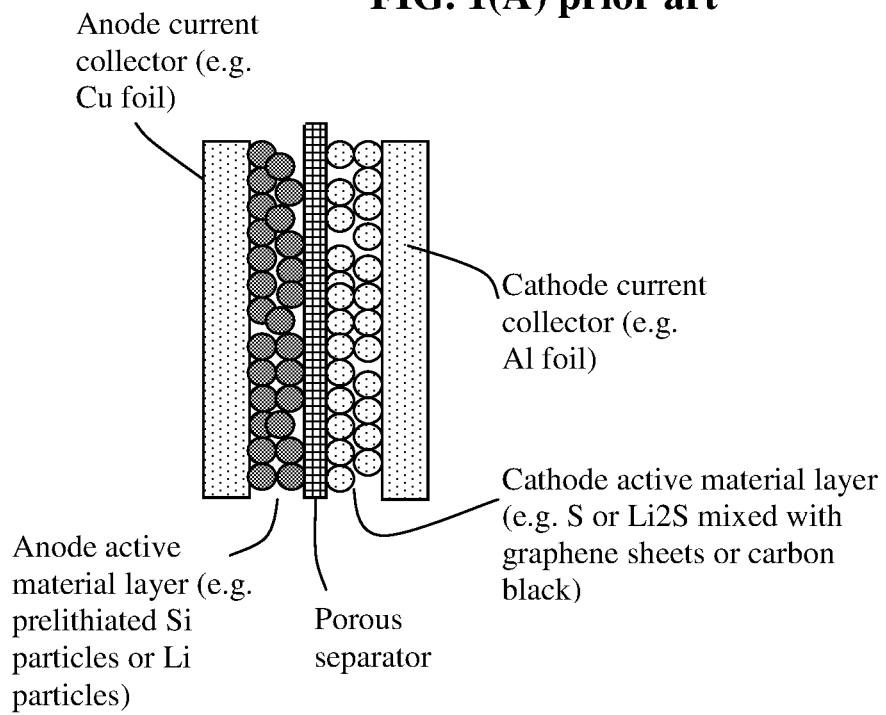
FIG. 1(B) Schematic of another prior art alkali metal-sulfur battery cell.

For convenience, the following discussion of preferred embodiments is primarily based on Li—S cells, but the same or similar composition, structure, and methods are applicable to Na—S and K—S cells. Examples are presented for Li—S cells, room-temperature Na—S cells, and K—S cells. Conventional Li—S cells are illustrated in FIG. 1(A) and FIG. 1(B).

A. Alkali Metal-Sulfur Cells (Using Lithium-Sulfur Cells as an Example)

The specific capacity and specific energy of a Li—S cell (or Na—S, or K—S cell) are dictated by the actual amount of sulfur that can be implemented in the cathode active layer (relative to other non-active ingredients, such as the binder resin and conductive filler) and the utilization rate of this sulfur amount (i.e. the utilization efficiency of the cathode active material or the actual proportion of S that actively participates in storing and releasing lithium ions). Using Li—S cell as an illustrative example, a high-capacity and high-energy Li—S cell requires a high amount of S in the cathode active layer (i.e. relative to the amounts of non-active materials, such as the binder resin, conductive additive, and other modifying or supporting materials) and a high S utilization efficiency). The present invention provides such a cathode active layer, its constituent powder mass product, the resulting Li—S cell, and a method of producing such a cathode active layer and battery.

Figure 2:
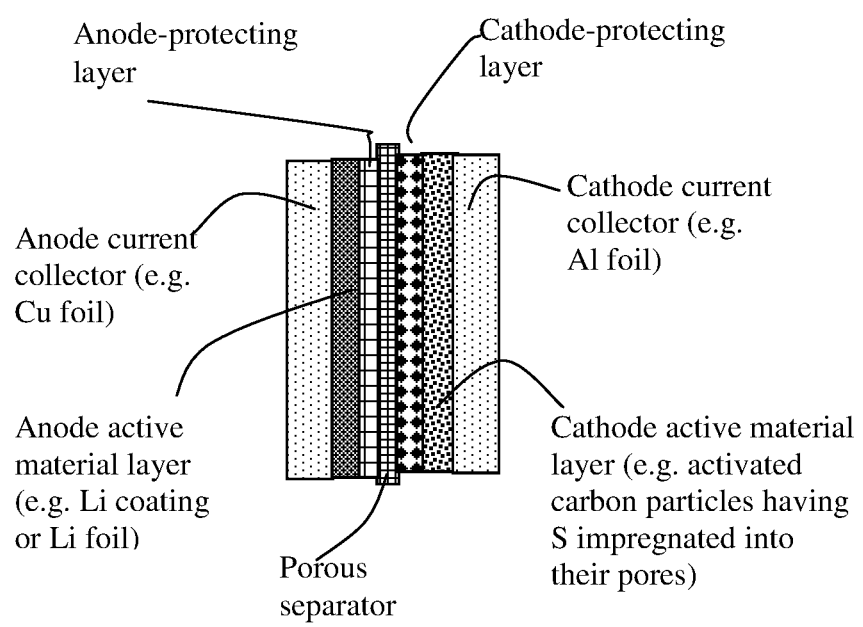
FIG. 2 Schematic of the presently invented alkali metal-sulfur cell containing an anode-protecting layer of a first sulfonated elastomer composite and/or a cathode-protecting layer of a second sulfonated elastomer composite. Either one or both protecting layers may be included in a lithium-sulfur cell, Na—S cell, or K—S cell.

In some embodiments, as illustrated in FIG. 2, the alkali metal-sulfur cell comprises (a) an anode active material layer and an optional anode current collector supporting the anode active material layer; (b) a cathode active material layer and an optional cathode current collector supporting the cathode active material layer; (c) an electrolyte with an optional porous separator layer in ionic contact with the anode active material layer and the cathode active material layer (separator is not required where a solid state electrolyte is used, for instance); and (d) a discrete anode-protecting layer disposed between the anode active material layer and the porous separator and/or a discrete cathode-protecting layer disposed between the porous separator and the cathode active material layer; wherein the anode-protecting layer or cathode-protecting layer comprises a conductive sulfonated elastomer composite having from 0.01% to 50% by weight of a conductive reinforcement material dispersed in a sulfonated elastomeric matrix material and said layer of conductive sulfonated elastomer composite has a thickness from 1 nm to 100 m, a fully recoverable tensile strain from 2% to 500%, a lithium ion conductivity from $10^{-7}$ S/cm to $5 \times 10^{-2}$ S/cm, and an electrical conductivity from $10^{-7}$ S/cm to 100 S/cm when measured at room temperature.

Preferably, the sulfonated elastomer composite layer has a lithium ion conductivity no less than $10^{-6}$ S/cm (typically from $10^{-5}$ S/cm to $5 \times 10^{-2}$ S/cm, measured at room temperature), and a thickness from 10 nm to 20 m.

In some embodiments, the sulfonated elastomer composite has from 0.01% to 50% by weight (based on the total weight of the sulfonated elastomer composite) of a conductive reinforcement material dispersed in a sulfonated elastomeric matrix material, wherein the conductive reinforcement material is selected from graphene sheets, carbon nanotubes, carbon nanofibers, metal nanowires, conductive polymer fibers, or a combination thereof.

The conducting reinforcement material is preferably in a filamentary or sheet-like form, such as a nanotube, nanofiber, nanowire, nanoplatelet, or nanodisc. In some embodiments, the conductive reinforcement material is selected from graphene sheets, carbon nanotubes, carbon nanofibers, metal nanowires, conductive polymer fibers, or a combination thereof. These are electron-conducting materials and the sulfonated elastomer matrix is a lithium ion- and sodium ion-conducting material. By combining such a sulfonated elastomer and a conducting reinforcement (0-50% by weight, preferably 0.1%-30%, and more preferably 0.1-15%), one obtains a composite that is both electron conducting and ion-conducting and capable of allowing electrons and lithium ions to migrate in and out of the particulate without much resistance.

The graphene sheets to be dispersed in a sulfonated elastomer matrix are preferably selected from pristine graphene, graphene oxide, reduced graphene oxide, graphene fluoride, graphene chloride, nitrogenated graphene, hydrogenated graphene, doped graphene, functionalized graphene, or a combination thereof. The graphene sheets preferably comprise single-layer graphene or few-layer graphene, wherein the few-layer graphene is defined as a graphene platelet formed of less than 10 graphene planes. The carbon nanotubes (CNTs) can be a single-walled CNT or multi-walled CNT. The carbon nanofibers may be vapor-grown carbon nanofibers or electrospinning based carbon nanofibers (e.g. electrospun polymer nanofibers that are subsequently carbonized).

Preferably, the sulfonated elastomeric matrix material contains a sulfonated version of an elastomer selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly (ethylene-co-octene) (POE) elastomer, poly(ethylene-co-butene) (PBE) elastomer, styrene-ethylene-butadiene-styrene (SEBS) elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

The sulfur-carbon hybrid, sulfur-graphite hybrid, sulfur-graphene hybrid, or conducting polymer-sulfur hybrid may be a mixture, blend, composite, or chemically or physically bonded entity of sulfur or sulfide with a carbon, graphite, graphene, or conducting polymer material. For instance, a sulfur-graphene hybrid can be a simple mixture (in a particle form) of sulfur and graphene prepared by ball-milling. Such a hybrid can contain sulfur bonded on surfaces of a graphene oxide sheet, etc. As another example, the sulfur-carbon hybrid can be a simple mixture (in a particle form) of sulfur and carbon nanotubes, or can contain sulfur residing in pores of activated carbon particles. In the instant cathode layer, these particles of sulfur hybrid are embraced by a sulfonated elastomer composite.

In the rechargeable alkali metal-sulfur cell, the metal sulfide may contain a material denoted by $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M preferably is selected from Li, Na, K, Mg, Zn, Cu, Ti, Ni, Co, Fe, or Al. In some preferred embodiments, the metal sulfide in the cathode layer contains $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_5$, $Na_2S_9$, $Na_2S_{10}$, $K_2S_1$, $K_2S_2$, $K_2S_3$, $K_2S_4$, $K_2S_5$, $K_2S_6$, $K_2S_7$, $K_2S_8$, $K_2S_9$, or $K_2S_{10}$.

In the rechargeable alkali metal-sulfur cell, the carbon or graphite material in the cathode active material layer may be selected from mesophase pitch, mesophase carbon, mesocarbon microbead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof. The graphene may be selected from pristine graphene, graphene oxide, reduced graphene oxide (RGO), graphene fluoride, nitrogenated graphene, hydrogenated graphene, doped graphene, functionalized graphene, or a combination thereof.

The conducting polymer-sulfur hybrid may preferably contain an intrinsically conductive polymer selected from polyaniline, polypyrrole, polythiophene, polyfuran, a bi-cyclic polymer, a sulfonated derivative thereof, or a combination thereof. This can be a simple mixture of sulfur or metal sulfide with a conducting polymer.

In certain embodiments, the sulfonated elastomer composite contains from 0.1% to 50% by weight of a lithium ion-, sodium ion-, or potassium ion-conducting additive dispersed therein. The lithium ion-conducting additive, along with the conductive reinforcement material, is dispersed in the sulfonated elastomer matrix and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

The lithium ion-conducting additive may be selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethysulfonylimide, LiBETI, lithium bis(trifluoromethanesulfonyl)imide, lithium bis(fluorosulfonyl)imide, lithium trifluoromethanesulfonimide, LiTFSI, an ionic liquid-based lithium salt, or a combination thereof. The sodium ion- or potassium ion-conducting additive, dispersed in the UHMW polymer, may be selected from sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium (NaN$(CF_3SO_2)_2$), sodium trifluoromethanesulfonimide (NaTFSI), bis-trifluoromethyl sulfonylimide potassium (KN$(CF_3SO_2)_2$), or a combination thereof.

A sulfonated elastomer is a high-elasticity material, which exhibits an elastic deformation that is at least 2% when measured under uniaxial tension (without an additive or reinforcement in the polymer, but can contain a lithium salt and/or liquid solvent dispersed in the polymer). In the field of materials science and engineering, the "elastic deformation" is defined as a deformation of a material (when being mechanically stressed) that is essentially fully recoverable and the recovery is essentially instantaneous upon release of the load. The elastic deformation of the sulfonated elastomer is preferably and typically greater than 5%, more preferably and typically greater than 10%, further more preferably and typically greater than 30%, still more preferably greater than 50%, and most preferably greater than 100%.

In some embodiments, a conductive sulfonated elastomer composite is implemented between an anode active layer and the porous separator layer (wherein a liquid electrolyte, polymer gel electrolyte, quasi-solid electrolyte, or other liquid-containing electrolyte is used). This anode-protecting layer is disposed between the anode active layer and a solid-state electrolyte zone or layer if no liquid is included in the electrolyte phase of the battery. This anode-protecting layer may be preimpregnated with a liquid electrolyte; any kind of electrolyte commonly used in an alkali metal-sulfur battery.

Not to be bound by theory, but the applicants believe that the anode-protecting layer is capable of performing at least the following three functions:

1) Being highly elastic, the sulfonated elastomer composite layer helps to maintain a good contact between an alkali metal layer (e.g. lithium metal foil, as the anode active material) and an electrolyte phase (e.g. an electrolyte/separator assembly or a solid-state electrolyte phase) when the alkali metal layer decreases in thickness (e.g. due to dissolution of Li in the electrolyte when the battery is discharged) or increases in thickness (e.g. due to re-deposition of lithium metal back to the Cu foil or lithium metal when the battery is recharged). The same function also works for the alkali metal-sulfur cell containing lithiated Si particles as an anode active material, as an example. Si particles and the entire anode active material layer can shrink and expand when the battery is discharged or charged. The sulfonated elastomer composite can expand and shrink responsive to the shrinkage and expansion of the anode active material layer. Such a conformal or congruent expansion/shrinkage of the sulfonated elastomer composite helps to eliminate the potential gap between the anode active material layer and the electrolyte or separator, thereby maintaining the lithium ion migration paths required of an operational Li—S battery.

2) The sulfonated elastomer matrix, infiltrated with a liquid electrolyte (before, during, or after the cell is fabricated) and coupled with its high-elasticity nature (good electrode-electrolyte contact), enables the returning alkali metal ions (e.g. Li$^+$ or Na$^+$ ions) to uniformly and successfully deposit back to the alkali metal surface, reducing the formation of dead lithium particles (or dead sodium particles), which otherwise become inactive. The uniform deposition of alkali metal also reduces the tendency to form the dangerous Li or Na dendrite.

3) The presence of the conductive reinforcement material (graphene sheets, CNTs, CNFs, etc.) are high strength materials, capable of stopping or deflecting the growth of dendrites (if initiated), preventing the dendrite from penetrating the separator and reaching the cathode side to induce internal shorting, which otherwise is a fire and explosion hazard.

Not to be bound by theory, but the applicants further believe that the cathode-protecting layer is capable of performing at least the following two functions:

1) Sulfur and lithium polysulfide, and the entire cathode active material layer, can expand and shrink when the battery is discharged or charged. The sulfonated elastomer composite layer implemented between the cathode active material layer and the separator layer (or the solid-state electrolyte phase) can shrink and expand responsive to the expansion and shrinkage of the cathode active material layer. Such a conformal or congruent expansion/shrinkage of the sulfonated elastomer composite helps to eliminate the potential gap between the cathode active material layer and the electrolyte or separator, thereby maintaining the lithium ion migration paths required of an operational Li—S battery.

2) The conductive material-reinforced sulfonated elastomer also acts to trap and block the sulfur or metal polysulfide species dissolved in the electrolyte, prevents continuing migration of these species to the anode side where they react with lithium (or sodium, or potassium) and are unable to return to the cathode (the shuttle effect). This shuttle effect is mainly responsible for continued and rapid capacity decay in a conventional Li—S, room-temperature Na—S, or K—S cell.

Figure 3:
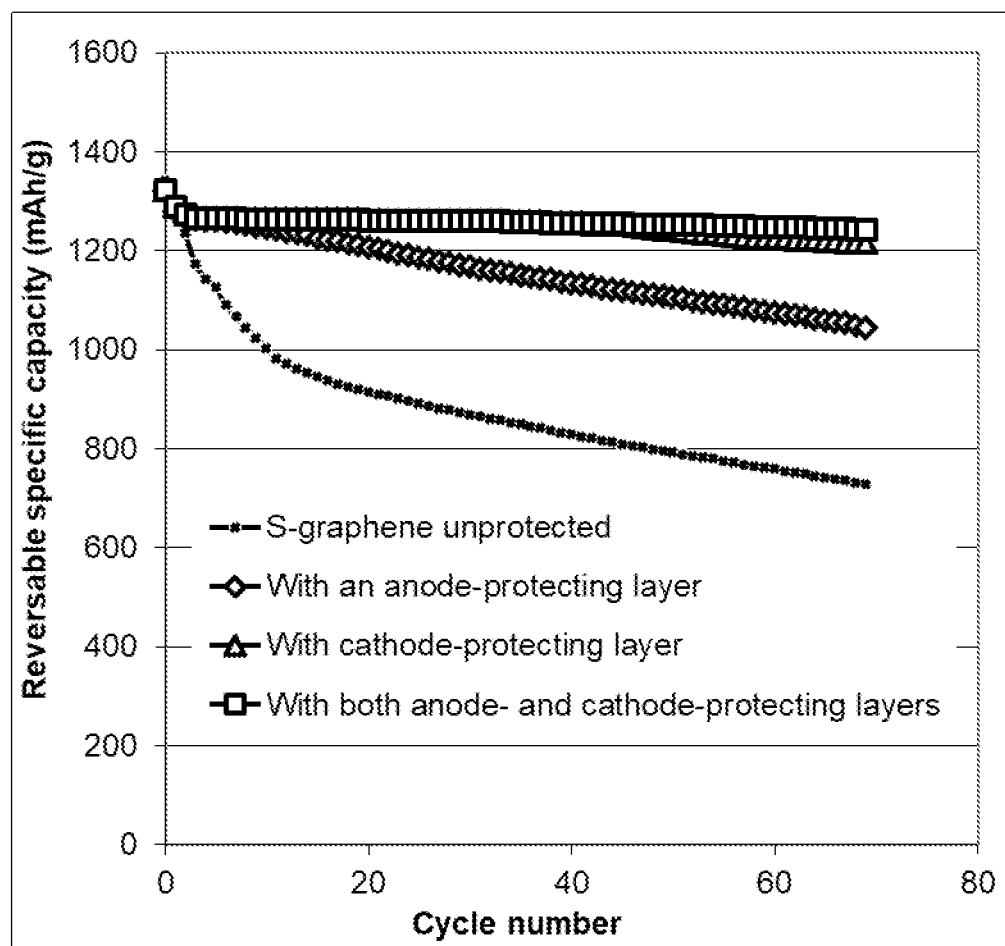
FIG. 3 The cycling behaviors of 4 cells, each having a Li foil anode and a cathode containing graphene-supported sulfur particles as the cathode active material: one without any protecting layer, one with an anode-protecting layer of a sulfonated elastomer composite, one with a cathode-protecting layer, and one has both anode- and cathode-protecting layer.

Alternatively, referring to the lower portion of FIG. 3, lithium sulfide is used as the cathode active material. A layer of sulfonated elastomer composite may encapsulate around the lithium polysulfide particle to form a core-shell structure. When the Li—S battery is charged and lithium ions are released from the cathode, the cathode active material particle contracts. However, the sulfonated elastomer composite is capable of elastically shrinking in a conformal manner; hence, leaving behind no gap between the protective shell and the sulfur. Such a configuration is amenable to subsequent lithium reaction with sulfur. The sulfonated elastomer composite shell expands and shrinks congruently with the expansion and shrinkage of the encapsulated core cathode active material particle, enabling long-term cycling stability of a Li—S or Na—S battery.

B. Sulfonated Elastomer Composites

Preferably and typically, the sulfonated elastomer composite has a lithium ion conductivity no less than $10^{-6}$ S/cm, more preferably no less than $10^{-4}$ S/cm, further preferably no less than $10^{-3}$ S/cm, and most preferably no less than $10^{-2}$ S/cm. In some embodiments, the sulfonated elastomer composite contains no other additive or filler dispersed therein (other than the conductive reinforcement material, such as graphene sheets, CNTs, CNFs, carbon fibers). In others, the sulfonated elastomer composite contains from 0.1% to 50% (preferably 1% to 35%) by weight of a lithium ion-conducting additive dispersed in a sulfonated elastomer matrix material. The sulfonated elastomer composite must have a high elasticity (elastic deformation strain value >2%). An elastic deformation is a deformation that is fully recoverable and the recovery process is essentially instantaneous (no significant time delay). The sulfonated elastomer composite can exhibit an elastic deformation from 5% up to 800% (8 times of its original length), more typically from 10% to 500%, and further more typically from 30% to 300%.

It may be noted that although a metal or a plastic typically has a high ductility (i.e. can be extended to a large strain without breakage), the majority of the deformation is plastic deformation (non-recoverable) and only a small amount of elastic deformation (typically <1% and more typically <0.2%). Thus, a metal or a plastic does not qualify as a high-elasticity material.

Further, we have unexpectedly discovered that the presence of an amount of a lithium salt or sodium salt (1-35% by weight) and a liquid solvent (0-50%) can significantly increase the lithium-ion or sodium ion conductivity of the sulfonated elastomer matrix.

The first step for producing a sulfonated elastomer composite layer is to dissolve an elastomer or its precursor (e.g. uncured oligomer or polymer) in a solvent to form a polymer solution. Subsequently, the conductive reinforcement material and other additive are dispersed in this polymer solution to form a suspension (dispersion or slurry). This suspension can then be subjected to a film-forming procedure (e.g. spraying, printing, casting, coating, etc.) and a solvent removal treatment. The elastomer precursor is then cured or polymerized.

One mat dispense and deposit a layer of a first sulfonated elastomer composite onto a primary surface of the anode active material and/or a layer of a second sulfonated elastomer composite onto a primary surface of a cathode active material layer. Alternatively, one may dispense and deposit a layer of a first sulfonated elastomer composite onto a primary surface of a separator layer and/or a layer of a second sulfonated elastomer composite to the other (opposing) primary surface of the separator layer. Further alternatively, one may prepare separate free-standing discrete layers of the first or second sulfonated elastomer composite first. One or both of these layers are then laminated together with the anode layer, separator/electrolyte, and the cathode layer to form a battery cell. The first and the second sulfonated elastomer composites may be identical or different in composition or structure.

The procedures of spraying, printing, casting, coating, and laminating are well-known in the art.

The sulfonated elastomer composite may form a mixture or blend with an electron-conducting polymer selected from polyaniline, polypyrrole, polythiophene, polyfuran, a bi-cyclic polymer, derivatives thereof (e.g. sulfonated versions), or a combination thereof.

In some embodiments, the sulfonated elastomer composite may form a mixture with a lithium ion-conducting polymer selected from regular molecular weight (<500,000 g/mole) version of poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a derivative thereof (e.g. sulfonated versions), or a combination thereof.

A wide variety of rubbers or elastomers may be readily sulfonated using known sulfonation procedures. Unsaturated rubbers that can be vulcanized to become elastomer include natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), Some elastomers are saturated rubbers that cannot be cured by sulfur vulcanization; they are made into a rubbery or elastomeric material via different means: e.g. by having a copolymer domain that holds other linear chains together. Each of these elastomers can be used to encapsulate particles of an anode active material by one of several means: melt mixing (followed by pelletizing and ball-milling, for instance), solution mixing (dissolving the anode active material particles in an uncured polymer, monomer, or oligomer, with or without an organic solvent) followed by drying (e.g. spray drying), interfacial polymerization, or in situ polymerization of elastomer in the presence of anode active material particles.

Sulfonated saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, and protein elastin. Sulfonated polyurethane and its copolymers (e.g. urea-urethane copolymer) are particularly useful elastomeric shell materials for encapsulating anode active material particles.

A variety of synthetic methods may be used to sulfonate an elastomer or rubber: (i) exposure to sulfur trioxide in vapor phase or in solution, possibly in presence of Lewis bases such as triethyl phosphate, tetrahydrofuran, dioxane, or amines; (ii) chlorosulfonic acid in diethyl ether; (iii) concentrated sulfuric acid or mixtures of sulfuric acid with alkyl hypochlorite; (iv) bisulfites combined to dioxygen, hydrogen peroxide, metallic catalysts, or peroxo derivates; and (v) acetyl sulfate.

Sulfonation of an elastomer or rubber may be conducted before, during, or after curing of the elastomer or rubber. Further, sulfonation of the elastomer or rubber may be conducted before or after the particles of an electrode active material are embraced or encapsulated by the elastomer/rubber or its precursor (monomer or oligomer). Sulfonation of an elastomer or rubber may be accomplished by exposing the elastomer/rubber to a sulfonation agent in a solution state or melt state, in a batch manner or in a continuous process. The sulfonating agent may be selected from sulfuric acid, sulfonic acid, sulfur trioxide, chlorosulfonic acid, a bisulfate, a sulfate (e.g. zinc sulfate, acetyl sulfate, etc.), a mixture thereof, or a mixture thereof with another chemical species (e.g. acetic anhydride, thiolacetic acid, or other types of acids, etc.). In addition to zinc sulfate, there are a wide variety of metal sulfates that may be used as a sulfonating agent; e.g. those sulfates containing Mg, Ca, Co, Li, Ba, Na, Pb, Ni, Fe, Mn, K, Hg, Cr, and other transition metals, etc.

For instance, a triblock copolymer, poly(styrene-isobutylene-styrene) or SIBS, may be sulfonated to several different levels ranging from 0.36 to 2.04 mequiv./g (13 to 82 mol % of styrene; styrene being 19 mol % of the unsulfonated block copolymer). Sulfonation of SIBS may be performed in solution with acetyl sulfate as the sulfonating agent. First, acetic anhydride reacts with sulfuric acid to form acetyl sulfate (a sulfonating agent) and acetic acid (a by-product). Then, excess water is removed since anhydrous conditions are required for sulfonation of SIBS. The SIBS is then mixed with the mixture of acetyl sulfate and acetic acid. Such a sulfonation reaction produces sulfonic acid substituted to the para-position of the aromatic ring in the styrene block of the polymer. Elastomers having an aromatic ring may be sulfonated in a similar manner.

A sulfonated elastomer also may be synthesized by copolymerization of a low level of functionalized (i.e. sulfonated) monomer with an unsaturated monomer (e.g. olefinic monomer, isoprene monomer or oligomer, butadiene monomer or oligomer, etc.).

C. Additional Details about the Structure of Li—S, Na—S, and K—S Cells

The anode active material layer of an alkali metal-sulfur cell can contain a foil or coating of Li, Na, or K supported by a current collector (e.g. Cu foil), as illustrated in the left-hand portion of FIG. 1(A) for a prior art Li—S cell. Alternatively, the anode active material may contain, for instance, particles of prelithiated Si particles or surface-stabilized Li particles, as illustrated in the left-hand portion of FIG. 2(B). However, the cathode layer in the instant cell is distinct, as already discussed above.

The electrolyte for an alkali metal-sulfur cell may be an organic electrolyte, ionic liquid electrolyte, gel polymer electrolyte, solid-state electrolyte (e.g. polymer solid electrolyte or inorganic solid electrolyte), quasi-solid electrolyte or a combination thereof. The electrolyte typically contains an alkali metal salt (lithium salt, sodium salt, and/or potassium salt) dissolved in a solvent.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone ($\gamma$-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Among them, $LiPF_6$, $LiBF_4$ and $LiN(CF_3SO_2)_2$ are preferred for Li—S cells, $NaPF_6$ and $LiBF_4$ for Na—S cells, and $KBF_4$ for K—S cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulfonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulfonyl) imide, bis(fluorosulfonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li—S cell.

In the presently invented alkali metal-sulfur cell, the cathode active layer comprises sulfur or a sulfur-containing compound preferably supported by or embedded in a conducting material, forming a sulfur-carbon hybrid, sulfur-graphite hybrid, sulfur-graphene hybrid, conducting polymer-sulfur hybrid, metal sulfide, sulfur compound, etc. These hybrid or compound materials are produced in the form of particles that contain a mixture, blend, composite, or bonded entity of sulfur or sulfide with a carbon, graphite, graphene, or conducting polymer material. Metal sulfides (e.g. lithium polysulfide, sodium polysulfide, etc.) and sulfur compounds are readily available in a fine particle form. Sulfur can be combined with a conducting material (carbon, graphite, graphene, and/or conducting polymer) to form a composite, mixture, or bonded entity (e.g. sulfur bonded on graphene oxide surface).

There are many well-known procedures that can be used to make the aforementioned sulfur-containing materials into particles. For instance, one may mix solid sulfur with a carbon or graphite material to form composite particles using ball-milling. The resulting particles are typically ellipsoidal or potato-like in shape having a size from 1 to 20 am. Also, one may infiltrate S or sulfide into the pores of porous carbon or graphite particles (e.g. activated carbon, mesoporous carbon, activated carbon fibers, etc.) using vapor phase infiltration, solution infiltration, chemical infiltration, or electrochemical infiltration. Alternatively, one may deposit sulfur onto surfaces of graphene sheets, CNTs, carbon nanofibers, etc. and then form these S-coated nanomaterials into a spherical or ellipsoidal shape using high-intensity ball-milling, spray-drying (of their suspensions), aerosol formation, etc. These particles are then encapsulated with a sulfonated elastomer composite using the micro-encapsulation processes discussed above.

The cathode in a conventional Li—S cell typically has less than 70% by weight of sulfur in a composite cathode composed of sulfur and the conductive additive/support. Even when the sulfur content in the prior art composite cathode reaches or exceeds 70% by weight, the specific capacity of the composite cathode is typically significantly lower than what is expected based on theoretical predictions. For instance, the theoretical specific capacity of sulfur is 1,675 mAh/g. A composite cathode composed of 70% sulfur (S) and 30% carbon black (CB), without any binder, should be capable of storing up to $1,675 \times 70\% = 1,172$ mAh/g. Unfortunately, the observed specific capacity is typically less than 75% or 879 mAh/g (often less than 50% or 586 mAh/g in this example) of what could be achieved. In other words, the active material (S) utilization rate is typically less than 75% (or even <50%). This has been a major issue in the art of Li—S cells.

Thus, it is highly advantageous to obtain a high sulfur loading and yet, concurrently, maintaining an ultra-thin/small thickness/diameter of sulfur for significantly enhanced sulfur utilization efficiency, energy density and power density. For instance, one can deposit nanoscaled sulfur (1-5 nm thick) on graphene surfaces using chemical, electrochemical, or vapor deposition to form S-coated or S-bonded graphene sheets. These S-coated or S-bonded graphene sheets are then aggregated together using a tumbling mixing, ball-milling, or spraying procedure. These steps enable the preparation of S-conducting material hybrids that contain 85%-99% by weight sulfur, yet maintaining a coating thickness or particle diameter from 1 nm to 5 nm. This ultra-small dimension enables fast lithium diffusion and lithium-sulfur reactions, leading to high S utilization efficiency (hence, high energy density) even at high charge-discharge rates. Several procedures of producing such small S particles or coating are illustrated in examples of this specification.

Again, the shuttling effect is related to the tendency for sulfur or alkali metal polysulfide that forms at the cathode to get dissolved in the solvent and for the dissolved lithium polysulfide species to migrate from the cathode to the anode, where they irreversibly react with lithium to form species that prevent sulfide from returning back to the cathode during the subsequent discharge operation of the Li—S cell (the detrimental shuttling effect). It appears that by implementing a cathode-protecting layer of a sulfonated elastomer composite, we have significantly reduced and even eliminated the shuttling effect, resulting in an alkali metal battery that has an exceptionally long cycle-life. We have addressed a critical, long-standing issue of alkali metal-sulfur batteries.

In all versions of the above-discussed alkali metal-sulfur cells, the anode active material may contain, as an example, lithium metal foil (or powder) or a high-capacity Si, Sn, Al, or $SnO_2$ capable of storing a great amount of lithium. The cathode active material may contain pure sulfur (if the anode active material contains lithium), lithium polysulfide, or any sulfur containing compound, molecule, or polymer. If the cathode active material includes lithium-containing species (e.g. lithium polysulfide) when the cell is made, the anode active material can be any material capable of storing a large amount of lithium (e.g. Si, Ge, Sn, Al, $SnO_2$, etc.).

At the anode side, when lithium metal is used as the sole anode active material in a Li—S cell, there is concern about the formation of lithium dendrites, which could lead to internal shorting and thermal runaway. Herein, we have used two approaches, separately or in combination, to address this dendrite formation issue: one involving the use of a protecting layer containing a sulfonated elastomer composite discussed above and the other the use of a nanostructure composed of conductive nanofilaments as an extended anode current collector. For the latter, multiple conductive nanofilaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nanofilament may be selected from, as examples, a carbon nanofiber (CNF), graphite nanofiber (GNF), carbon nanotube (CNT), metal nanowire (MNW), conductive nanofibers obtained by electrospinning, conductive electrospun composite nanofibers, nanoscaled graphene platelet (NGP), or a combination thereof. The nanofilaments may be bonded by a binder material selected from a polymer, coal tar pitch, petroleum pitch, mesophase pitch, coke, or a derivative thereof.

Nanofibers may be selected from the group consisting of an electrically conductive electrospun polymer fiber, electrospun polymer nanocomposite fiber comprising a conductive filler, nanocarbon fiber obtained from carbonization of an electrospun polymer fiber, electrospun pitch fiber, and combinations thereof. For instance, a nanostructured electrode can be obtained by electrospinning of polyacrylonitrile (PAN) into polymer nanofibers, followed by carbonization of PAN. It may be noted that some of the pores in the structure, as carbonized, are greater than 100 nm and some smaller than 100 nm.

The presently invented protective layers may be incorporated in one of at least four broad classes of rechargeable alkali metal-sulfur cells (using Li as an example):
(A) Lithium metal-sulfur with a conventional anode configuration: The cell contains an optional cathode current collector, a cathode layer, a separator/electrolyte, an anode, and an anode current collector. Potential dendrite formation may be overcome by using the invented anode-protecting layer. There can be a cathode-protecting layer.
(B) Lithium metal-sulfur cell with a nanostructured anode configuration: The cell contains an optional cathode current collector, a cathode, a separator/electrolyte, an optional anode current collector, and a nanostructure to accommodate lithium metal that is deposited back to the anode during a charge or re-charge operation. This nanostructure (web, mat, or paper) of nanofilaments provide a uniform electric field enabling uniform Li metal deposition, reducing the propensity to form dendrites. This configuration can provide a dendrite-free cell for a long and safe cycling behavior. Additionally, there can be an anode-protecting layer and/or a cathode-protecting layer.
(C) Lithium ion-sulfur cell with a conventional anode: For instance, the cell contains an anode composed of anode active graphite particles bonded by a binder, such as polyvinylidene fluoride (PVDF) or styrene-butadiene rubber (SBR). The cell also contains a cathode current collector, a cathode, a separator/electrolyte, and an anode current collector. There can be an anode-protecting layer and/or a cathode-protecting layer; and
(D) Lithium ion-sulfur cell with a nanostructured anode: For instance, the cell contains a web of nanofibers coated with Si coating or bonded with Si nanoparticles. The cell also contains an optional cathode current collector, a cathode, a separator/electrolyte, and an anode current collector. There can be an anode-protecting layer and/or a cathode-protecting layer. This configuration provides an ultra-high capacity, high energy density, and a safe and long cycle life.

In the lithium-ion sulfur cell (e.g. as described in (C) and (D) above), the anode active material can be selected from a wide range of high-capacity materials, including (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof. Non-lithiated versions may be used if the cathode side contains lithium polysulfides or other lithium sources when the cell is made.

A possible lithium metal cell may be comprised of an anode current collector, an electrolyte phase (optionally but preferably supported by a porous separator, such as a porous polyethylene-polypropylene co-polymer film), a cathode of the instant invention, and an optional cathode collector.

For a sodium ion-sulfur cell or potassium ion-sulfur cell, the anode active material layer can contain an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof (predoped or preloaded with Na), and combinations thereof.

Example 1: Mixing of Sulfur with Carbon/Graphite Particles Via Ball-Milling to Form Sulfur-Containing Particles Sulfur and lithium polysulfide particles and particles of soft carbon (i.e. graphitizable disordered carbon), natural graphite, mesophase carbon, expanded graphite flakes, carbon nanofibers, and graphene sheets (50% to 85% by weight of S in the resulting composite or hybrid) were physically blended and then subjected to ball milling for 2-24 hours to obtain S-containing composite particles (typically in a ball or potato shape). The particles have a typical size of 1-10 µm. These particles, along with a conductive additive (5% by wt.) and a resin binder (PVDF, 5%), were then combined and made into a layer of cathode using the well-known slurry coating procedure.

Example 2: Simple Sulfur Melt or Liquid Solution Mixing

One way to combine sulfur with a conducting material (e.g. carbon/graphite particles) is to use a solution or melt mixing process. Highly porous activated carbon particles, chemically etched mesocarbon microbeads (activated MCMBs), and exfoliated graphite worms were mixed with sulfur melt at 117-120° C. (slightly above the melting point of S, 115.2° C.) for 10-60 minutes to obtain sulfur-impregnated carbon particles for use a cathode active material.

Example 3: Preparation of Sulfur-Coated Graphene Sheets and their Secondary Particles (Particulates)

The step involves producing vapor of elemental sulfur, allowing deposition of S vapor on surfaces of single-layer or few-layer graphene sheets. The graphene sheets, suspended in a liquid medium (e.g. graphene oxide in water or graphene in NMP), were sprayed onto a substrate (e.g. glass surface) to form a thin layer of graphene sheets. This thin layer of graphene was then exposed to sublimation-generated physical vapor deposition. Sublimation of solid sulfur occurs at a temperature greater than 40° C., but a significant and practically useful sublimation rate typically does not occur until the temperature is above 100° C. We typically used 117-160° C. with a vapor deposition time of 10-120 minutes to deposit a thin film of sulfur on graphene surface (sulfur thickness being approximately from 1 nm to 10 nm). This thin layer of graphene having a thin film of sulfur deposited thereon was then easily broken into pieces of S-coated graphene sheets using an air jet mill. Some of these sheets were made into secondary particles of approximately 5-15 µm in diameter (e.g. via spray-drying) and used as a cathode active material.

Example 4: Electrochemical Impregnation of S in Various Porous Carbon/Graphite Particles The electrochemical impregnation of S into pores of activated carbon fibers, activated carbon nanotubes, and activated artificial graphite particles was conducted by aggregating these particles/fibers into a loosely packed layer. In this approach, an anode, electrolyte, and a layer of such a loosely packed structure (serving as a cathode layer) are positioned in an external container outside of a lithium-sulfur cell. The needed apparatus is similar to an electroplating system, which is well-known in the art.

In a typical procedure, a metal polysulfide ($M_xS_y$) was dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polysulfide in this desired solvent. A greater solubility would mean a larger amount of sulfur can be derived from the electrolyte solution.

The electrolyte solution was then poured into a chamber or reactor under a dry and controlled atmosphere condition (e.g. He or nitrogen gas). A metal foil was used as the anode and a layer of the porous structure as the cathode; both being immersed in the electrolyte solution. This configuration constitutes an electrochemical impregnation and deposition system. The step of electrochemically impregnating sulfur into pores was conducted at a current density in the range from 1 mA/g to 10 A/g, based on the layer weight of the porous carbon/graphite particles/fibers.

The chemical reactions that occur in this reactor may be represented by the following equation: $M_xS_y \rightarrow M_xS_{y-z}+zS$ (typically z=1-4). The sulfur coating thickness or particle diameter and the amount of S coating/particles impregnated may be controlled by the electrochemical reaction current density, temperature and time. In general, a lower current density and lower reaction temperature lead to a more uniform impregnation of S and the reactions are easier to control. A longer reaction time leads to a larger amount of S saturated in the pores. Additionally, the electrochemical method is capable of rapidly converting the impregnated S into metal polysulfide (lithium polysulfide, sodium polysulfide, and potassium polysulfide, etc.).

Example 5: Chemical Reaction-Induced Impregnation of Sulfur

A chemical impregnation method was herein utilized to prepare S-impregnated carbon fibers that have been chemically activated. The procedure began with adding 0.58 g $Na_2S$ into a flask that had been filled with 25 ml distilled water to form a $Na_2S$ solution. Then, 0.72 g elemental S was suspended in the $Na_2S$ solution and stirred with a magnetic stirrer for about 2 hours at room temperature. The color of the solution changed slowly to orange-yellow as the sulfur dissolved. After dissolution of the sulfur, a sodium polysulfide ($Na_2S_x$) solution was obtained (x=4-10).

Subsequently, a sulfur-impregnated carbon fiber sample was prepared by a chemical impregnation method in an aqueous solution. First, 180 mg of expansion-treated carbon fibers was suspended in 180 ml ultrapure water with a surfactant and then sonicated at 50° C. for 5 hours to form a stable carbon fiber dispersion. Subsequently, the $Na_2S_x$ solution was added to the above-prepared dispersions in the presence of 5 wt % surfactant cetyl trimethyl-ammonium bromide (CTAB), the as-prepared carbon fiber/$Na_2S_x$ blended solution was sonicated for another 2 hours and then titrated into 100 ml of 2 mol/L HCOOH solution at a rate of 30-40 drops/min and stirred for 2 hours. Finally, the precipitate was filtered and washed with acetone and distilled water several times to eliminate salts and impurities. After filtration, the precipitate was dried at 50° C. in a drying oven for 48 hours. The reaction may be represented by the following reaction: $S_x^{2-}+2H^+ \rightarrow (x-1) S+H_2S$.

Example 6: Redox Chemical Reaction-Induced Impregnation of Sulfur in Activated MCMBs and Activated Needle Coke In this chemical reaction-based deposition process, sodium thiosulfate ($Na_2S_2O_3$) was used as a sulfur source and HCl as a reactant. An activated MCMB-water or activated needle coke-water suspension was prepared and then the two reactants (HCl and $Na_2S_2O_3$) were poured into this suspension. The reaction was allowed to proceed at 25-75° C. for 1-3 hours, leading to impregnation of S into pores of the activated structures. The reaction may be represented by the following reaction: $2HCl+Na_2S_2O_3 \rightarrow 2NaCl+S\downarrow+SO_2\uparrow+H_2O$.

Example 7: Sulfonation of Triblock Copolymer Poly(Styrene-Isobutylene-Styrene) or SIBS An example of the sulfonation procedure used in this study is summarized as follows: a 10% (w/v) solution of SIBS (50 g) and a desired amount of graphene oxide sheets (0.15% to 40.5% by wt.) in methylene chloride (500 ml) was prepared. The solution was stirred and refluxed at approximately 40 8 C, while a specified amount of acetyl sulfate in methylene chloride was slowly added to begin the sulfonation reaction. Acetyl sulfate in methylene chloride was prepared prior to this reaction by cooling 150 ml of methylene chloride in an ice bath for approximately 10 min. A specified amount of acetic anhydride and sulfuric acid was then added to the chilled methylene chloride under stirring conditions. Sulfuric acid was added approximately 10 min after the addition of acetic anhydride with acetic anhydride in excess of a 1:1 mole ratio. This solution was then allowed to return to room temperature before addition to the reaction vessel.

After approximately 5 h, the reaction was terminated by slowly adding 100 ml of methanol. The reacted polymer solution was then precipitated with deionized water. The precipitate was washed several times with water and methanol, separately, and then dried in a vacuum oven at 50° C. for 24 h. This washing and drying procedure was repeated until the pH of the wash water was neutral. After this process, the final polymer yield was approximately 98% on average. This sulfonation procedure was repeated with different amounts of acetyl sulfate to produce several sulfonated polymers with various levels of sulfonation or ion-exchange capacities (IECs). The mol % sulfonation is defined as: mol %=(moles of sulfonic acid/moles of styrene)×100%, and the IEC is defined as the mille-equivalents of sulfonic acid per gram of polymer (mequiv./g).

After sulfonation and washing of each polymer, the S-SIBS samples were dissolved in a mixed solvent of toluene/hexanol (85/15, w/w) with concentrations ranging from 0.5 to 2.5% (w/v). Desired amounts of graphene sheets (if not added at an earlier stage) were then added into the solution to form slurry samples. The slurry samples were slot-die coated into layers of sulfonated elastomer composite.

Example 8: Synthesis of Sulfonated Polybutadiene (PB) by Free Radical Addition of Thiolacetic Acid (TAA) Followed by In Situ Oxidation with Performic Acid A representative procedure is given as follows. PB (8.0 g) was dissolved in toluene (800 mL) under vigorous stirring for 72 h at room temperature in a 1 L round-bottom flask. Benzophenone (BZP) (0.225 g; 1.23 mmol; BZP/olefin molar ratio=1:120) and TAA (11.9 mL; 0.163 mol, TAA/olefin molar ratio=1.1) and a desired amount of graphene sheets (0.1%-40% by wt.) were introduced into the reactor, and the polymer solution was irradiated for 1 h at room temperature with UV light of 365 nm and power of 100 W.

The resulting thioacetylated polybutadiene (PB-TA)/graphene composite was isolated by pouring 200 mL of the toluene solution in a plenty of methanol and the polymer recovered by filtration, washed with fresh methanol, and dried in vacuum at room temperature (Yield=3.54 g). Formic acid (117 mL; 3.06 mol; HCOOH/olefin molar ratio=25), along with a desired amount of anode active material particles, from 10 to 100 grams) were added to the toluene solution of PB-TA at 50° C. followed by slow addition of 52.6 mL of hydrogen peroxide (35 wt %; 0.61 mol; $H_2O_2$/olefin molar ratio=5) in 20 min. We would like to caution that the reaction is autocatalytic and strongly exothermic. The resulting slurry was spray-dried to obtain sulfonated polybutadiene (PB-SA)/graphene composite-encapsulated S particles.

It may be noted that graphene sheets may be added at different stages of the procedure: before, during or after BZP is added or before/during/after the active material particles are added.

Example 9: Synthesis of Sulfonated SBS

Sulfonated styrene-butadiene-styrene triblock copolymer (SBS) based elastomer was directly synthesized. First, SBS (optionally along with graphene sheets) is first epoxidized by performic acid formed in situ, followed by ring-opening reaction with an aqueous solution of $NaHSO_3$. In a typical procedure, epoxidation of SBS was carried out via reaction of SBS in cyclohexane solution (SBS concentration=11 g/100 mL) with performic acid formed in situ from HCOOH and 30% aqueous $H_2O_2$ solution at 70° C. for 4 h, using 1 wt % poly(ethylene glycol)/SBS as a phase transfer catalyst. The molar ratio of $H_2O_2$/HCOOH was 1. The product (ESBS) was precipitated and washed several times with ethanol, followed by drying in a vacuum dryer at 60° C.

Subsequently, ESBS was first dissolved in toluene to form a solution with a concentration of 10 g/100 mL, into which was added 5 wt % TEAB/ESBS as a phase transfer catalyst and 5 wt % DMA/ESBS as a ring-opening catalyst. Herein, TEAB=tetraethyl ammonium bromide and DMA=N,N-dimethyl aniline. An aqueous solution of $NaHSO_3$ and $Na_2SO_3$ (optionally along with graphene sheets or CNTs, if not added earlier) was then added with vigorous stirring at 60° C. for 7 h at a molar ratio of $NaHSO_3$/epoxy group at 1.8 and a weight ratio of $Na_2SO_3$/$NaHSO_3$ at 36%. This reaction allows for opening of the epoxide ring and attaching of the sulfonate group according to the following reaction:

Example 10: Synthesis of Sulfonated SBS by Free Radical Addition of Thiolacetic Acid (TAA) Followed by In Situ Oxidation with Performic Acid A representative procedure is given as follows. SBS (8.000 g) in toluene (800 mL) was left under vigorous stirring for 72 hours at room temperature and heated later on for 1 h at 65° C. in a 1 L round-bottom flask until the complete dissolution of the polymer. Thus, benzophenone (BZP, 0.173 g; 0.950 mmol; BZP/olefin molar ratio=1:132) and TAA (8.02 mL; 0.114 mol, TAA/olefin molar ratio=1.1) were added, and the polymer solution was irradiated for 4 h at room temperature with UV light of 365 nm and power of 100 W. To isolate a fraction of the thioacetylated sample (S(B-TA)S), 20 mL of the polymer solution was treated with plenty of methanol, and the polymer was recovered by filtration, washed with fresh methanol, and dried in vacuum at room temperature. The toluene solution containing the thioacetylated polymer was equilibrated at 50° C., and 107.4 mL of formic acid (2.84 mol; HCOOH/olefin molar ratio=27.5) and 48.9 mL of hydrogen peroxide (35 wt %; 0.57 mol; $H_2O_2$/olefin molar ratio=5.5) were added in about 15 min. It may be cautioned that the reaction is autocatalytic and strongly exothermic! The conductive reinforcement material was added before or after this reaction. The resulting slurry was stirred for 1 h, and then most of the solvent was distilled off in vacuum at 35° C. Finally, the slurry containing the sulfonated elastomer was added with acetonitrile, cast into films, washed with fresh acetonitrile, and dried in vacuum at 35° C. to obtain sulfonated elastomers.

Other elastomers (e.g. polyisoprene, EPDM, EPR, polyurethane, etc.) were sulfonated in a similar manner. Alternatively, all the rubbers or elastomers can be directly immersed in a solution of sulfuric acid, a mixture of sulfuric acid and acetyl sulfate, or other sulfonating agent discussed above to produce sulfonated elastomers/rubbers. Again, graphene sheets (or other conductive reinforcement material) may be added at various stages of the procedure.

Example 11: Graphene Oxide from Sulfuric Acid Intercalation and Exfoliation of MCMBs MCMB (mesocarbon microbeads) were supplied by China Steel Chemical Co. This material has a density of

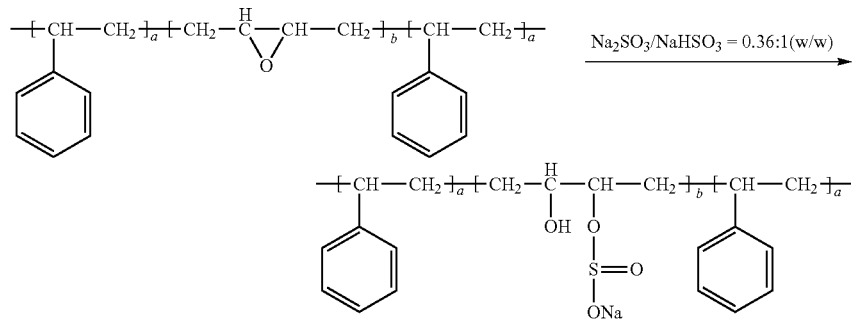

The reaction was terminated by adding a small amount of acetone solution containing antioxidant. The mixture was washed with distilled water and then precipitated by ethanol while being cast into thin films, followed by drying in a vacuum dryer at 50° C. It may be noted that graphene sheets (or CNTs, etc.) may be added during various stages of the aforementioned procedure (e.g. right from the beginning, or prior to the ring opening reaction).

about 2.24 g/cm³ with a median particle size of about 16 μm. MCMBs (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace preset at a desired temperature, 800° C.-1,100° C. for 30-90 seconds to obtain graphene samples. A small quantity of graphene was mixed with water and ultrasonicated at 60-W power for 10 minutes to obtain a suspension. A small amount was sampled out, dried, and investigated with TEM, which indicated that most of the NGPs were between 1 and 10 layers. The oxygen content of the graphene powders (GO or RGO) produced was from 0.1% to approximately 25%, depending upon the exfoliation temperature and time.

Example 12: Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798, 878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 4. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes to obtain a homogeneous graphene-water suspension.

Example 13: Preparation of Pristine Graphene Sheets

Pristine graphene sheets were produced by using the direct ultrasonication or liquid-phase exfoliation process. In a typical procedure, five grams of graphite flakes, ground to approximately 20 µm in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets were pristine graphene that had never been oxidized and were oxygen-free and relatively defect-free. There are substantially no other non-carbon elements.

Example 14: Preparation of Graphene Fluoride (GF) Sheets

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). A precooled Teflon reactor was filled with 20-30 mL of liquid precooled $ClF_3$, and then the reactor was closed and cooled to liquid nitrogen temperature. Subsequently, no more than 1 g of HEG was put in a container with holes for $ClF_3$ gas to access the reactor. After 7-10 days, a gray-beige product with approximate formula $C_2F$ was formed. GF sheets were then dispersed in halogenated solvents to form suspensions.

Example 15: Preparation of Nitrogenated Graphene Sheets

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenated graphene sheets remain dispersible in water.

Example 16: Sulfonated Elastomer Composite-Based Protective Layers

Several tensile testing specimens were cut from sulfonated elastomer films (with or without additive/reinforcement) and tested with a universal testing machine. The testing results indicate that this series of elastomers have an elastic deformation from approximately 160% to 360%. These above are for neat sulfonated elastomers without any additive. The addition of up to 30% by weight of a lithium salt typically reduces this elasticity down to a reversible tensile strain from approximately 10% to 100%.

Several series of Li metal-sulfur and Li-ion sulfur cells were prepared using the presently prepared sulfonated elastomer composites as an anode-protecting layer and/or a cathode-protecting layer. The first series was a Li metal cell containing an anode-protecting layer disposed between a PE/PP-based porous separator and the Li metal foil and the second series was also a Li metal cell having no anode-protecting layer. The third series was a Li-ion cell having a nanostructured anode of conductive filaments (based on electrospun carbon fibers coated with a thin layer of Si using CVD) plus an anode-protecting layer between this Si-based anode active material layer and a porous separator. The fourth series was a Li-ion cell similar to the third series, but without an anode-protecting layer. All these cells were made into two groups: one group containing a cathode-protecting layer and the other no cathode-protecting layer.

We have found that after large numbers of charge/discharge cycles, the cells containing an anode-protecting layer were essentially dendrite-free. Such an anode-protecting layer also appears to reduce the formation of dead lithium particles separated from the Li foil; this implies a more stable lithium-electrolyte interface. The presence of a cathode-protecting layer has a dramatic impact on improving the cycle-life of an alkali metal-S cell by essentially eliminating the shuttle effect.

Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM).

The cycling behaviors of 4 cells (each having a Li foil anode and a cathode containing graphene-supported sulfur (S/graphene) particles as the cathode active material) are shown in FIG. 3, which indicates that a sulfonated PU/graphene composite-based cathode-protecting layer is very effective in extending the cycle-life of a Li—S cell. The anode-protecting layer makes a more efficient use of lithium metal by reducing the amount of dead Li particles (these particles are physically separated from the Li metal foil and no longer active). A combination of an anode-protecting layer and a cathode-protecting layer provides the most stable cycling response.

Example 17: Sulfonated SBS Elastomer Films as Electrode-Protecting Layers and Graphene/Sulfur Particles as a Cathode Active Material Tensile testing was also conducted on the sulfonated SBS elastomer films (without hybrid cathode particles). This series of elastomers can be elastically stretched up to approximately 230% (having some lithium salt dispersed therein).

Figure 4:
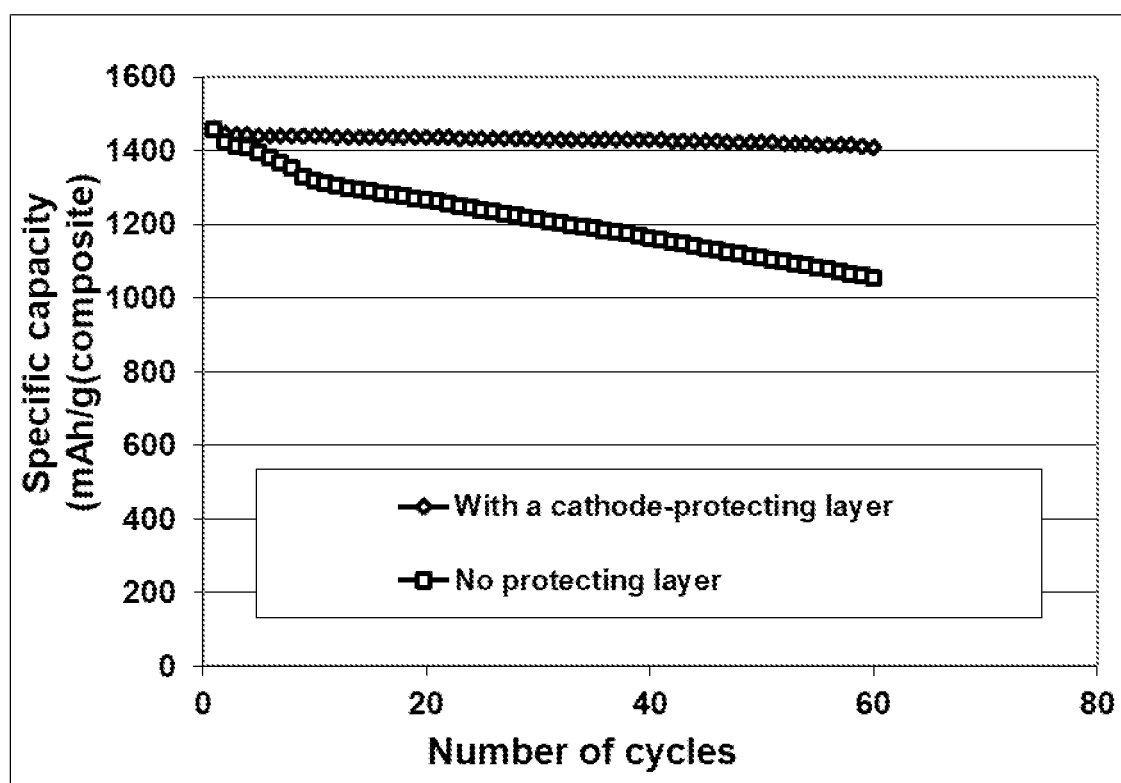
FIG. 4 The cathode specific capacity values of two Li—S batteries each containing ball-milled CNT/S particles as a cathode active material: one containing a sulfonated SBS elastomer composite-based cathode-protecting layer and the other none.

Shown in FIG. 4 are the cycling behaviors of 2 Li—S cells (based on their discharge capacities after 30 cycles); one cell has a cathode-protecting layer containing graphene-reinforced sulfonated SBS composite and the other cell has no cathode-protecting layer. The sulfonated elastomer composite has imparted cycle stability to the Li—S cell in a most dramatic manner.

Figure 5:
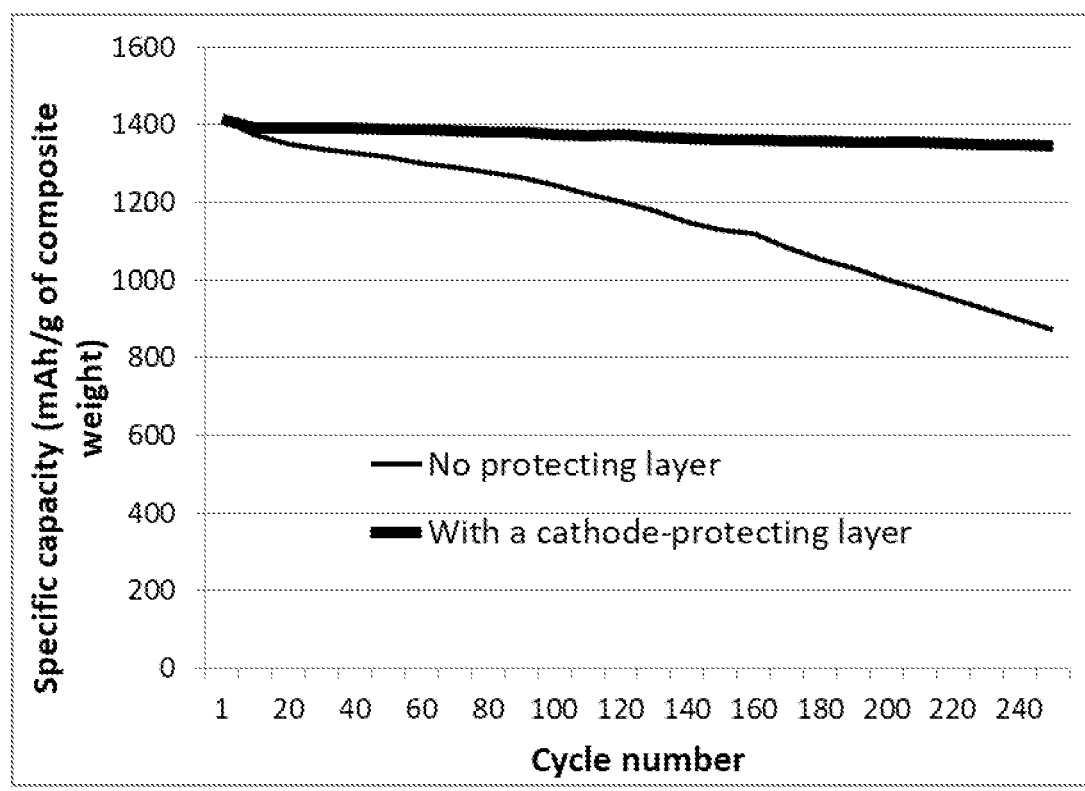
FIG. 5 The cathode specific capacity values of two Na—S cells having a cathode active material layer featuring (1) sulfonated elastomer composite-encapsulated sulfur-MCMB (activated) composite particles; and (2) un-protected sulfur-MCMB (activated) composite particles, respectively.

Example 18: Sulfonated PB Elastomer Composite-Based Protecting Layers and Sulfur-Impregnated Activated MCMB Particles as the Cathode Active Materials FIG. 5 shows the cycling behavior of two room-temperature Na—S cell: one cell has a cathode containing SIBS/RGO composite-based protecting layer and a cathode active material layer containing sulfur-MCMB (activated) composite particles as the cathode active material and the other cell has a cathode containing sulfur-MCMB (activated) composite particles but no protecting layer. Again, the sulfonated elastomer composite-based cathode-protecting layer has significantly improved the cycle stability to the Na—S cell.

The above cycling stability data have clearly demonstrated that the shuttling effect commonly associated with Li—S or Na—S cells has been significantly reduced or essentially eliminated by the presently invented sulfonated elastomer composite-based cathode-protecting layer approach.

Example 19: Effect of Lithium Ion-Conducting Additive in a Sulfonated Elastomer Composite A wide variety of lithium ion-conducting additives were added to several different sulfonated elastomers to prepare electrode-protecting layers. We have discovered that these composite materials are suitable protecting layers (preventing dendrite formation in the anode side and reducing/eliminating the shuttle effect at the cathode side (not allowing S or metal polysulfide to diffuse out of the cathode), yet still allowing reasonable alkali metal migration rates) provided that their lithium ion conductivity at room temperature is no less than $10^{-6}$ S/cm. With these materials, lithium ions appear to be capable of readily diffusing in and out of the protecting layer having a thickness no greater than 1 μm. For thicker layers (e.g. 10 μm), a lithium ion conductivity at room temperature no less than $10^{-4}$ S/cm would be required.

TABLE 1

Lithium ion conductivity of various sulfonated elastomer composite compositions as a shell material for protecting anode active material particles.

| Sample No. | Lithium-conducting additive | Graphene-sulfonated elastomer (1-2 μm thick); 5% graphene unless otherwise noted | Li-ion conductivity (S/cm) |
| --- | --- | --- | --- |
| E-1s | $Li_2CO_3$ + $(CH_2OCO_2Li)_2$ | 70-99% polyurethane, 2% RGO | $4.8 \times 10^{-6}$ to $4.9 \times 10^{-3}$ S/cm |
| E-2s | $Li_2CO_3$ + $(CH_2OCO_2Li)_2$ | 65-99% polyisoprene, 8% pristine graphene | $2.3 \times 10^{-5}$ to $7.8 \times 10^{-4}$ S/cm |
| E-3s | $Li_2CO_3$ + $(CH_2OCO_2Li)_2$ | 65-80% SBR, 15% RGO | $8.8 \times 10^{-6}$ to $8.9 \times 10^{-4}$ S/cm |
| D-4s | $Li_2CO_3$ + $(CH_2OCO_2Li)_2$ | 70-99% urethane-urea, 12% nitrogenated graphene | $2.4 \times 10^{-6}$ to $7.3 \times 10^{-4}$ S/cm |
| D-5s | $Li_2CO_3$ + $(CH_2OCO_2Li)_2$ | 75-99% polybutadiene | $2.4 \times 10^{-5}$ to $7.9 \times 10^{-3}$ S/cm |
| B1s | LiF + LiOH + $Li_2C_2O_4$ | 80-99% chloroprene rubber | $2.2 \times 10^{-6}$ to $6.4 \times 10^{-4}$ S/cm |
| B2s | LiF + HCOLi | 80-99% EPDM | $5.7 \times 10^{-6}$ to $4.8 \times 10^{-3}$ S/cm |
| B3s | LiOH | 70-99% polyurethane | $4.5 \times 10^{-5}$ to $5.3 \times 10^{-3}$ S/cm |
| B4s | $Li_2CO_3$ | 70-99% polyurethane | $6.3 \times 10^{-5}$ to $5.8 \times 10^{-3}$ S/cm |
| B5s | $Li_2C_2O_4$ | 70-99% polyurethane | $1.6 \times 10^{-5}$ to $2.7 \times 10^{-3}$ S/cm |
| B6s | $Li_2CO_3$ + LiOH | 70-99% polyurethane | $3.6 \times 10^{-5}$ to $5.9 \times 10^{-3}$ S/cm |
| C1s | $LiClO_4$ | 70-99% urethane-urea | $5.3 \times 10^{-5}$ to $4.6 \times 10^{-3}$ S/cm |
| C2s | $LiPF_6$ | 70-99% urethane-urea | $5.5 \times 10^{-5}$ to $1.8 \times 10^{-3}$ S/cm |
| C3s | $LiBF_4$ | 70-99% urethane-urea | $3.4 \times 10^{-5}$ to $4.8 \times 10^{-4}$ S/cm |
| C4s | LiBOB + $LiNO_3$ | 70-99% urethane-urea | $8.2 \times 10^{-6}$ to $3.2 \times 10^{-4}$ S/cm |
| S1s | Sulfonated polyaniline | 85-99% SBR | $9.3 \times 10^{-6}$ to $9.4 \times 10^{-4}$ S/cm |
| S2s | Sulfonated SBR | 85-99% SBR | $8.6 \times 10^{-6}$ to $6.5 \times 10^{-4}$ S/cm |

TABLE 1-continued

Lithium ion conductivity of various sulfonated elastomer composite compositions as a shell material for protecting anode active material particles.

| Sample No. | Lithium-conducting additive | Graphene-sulfonated elastomer (1-2 μm thick); 5% graphene unless otherwise noted | Li-ion conductivity (S/cm) |
|---|---|---|---|
| S3s | Sulfonated PVDF | 80-99% chlorosulfonated polyethylene (CS-PE) | $5.4 \times 10^{-6}$ to $5.8 \times 10^{-4}$ S/cm |
| S4s | Polyethylene oxide | 80-99% CS-PE | $6.6 \times 10^{-6}$ to $4.7 \times 10^{-4}$ S/cm |

Example 20: Cycle Stability of Various Rechargeable Lithium Battery Cells

Figure 6:
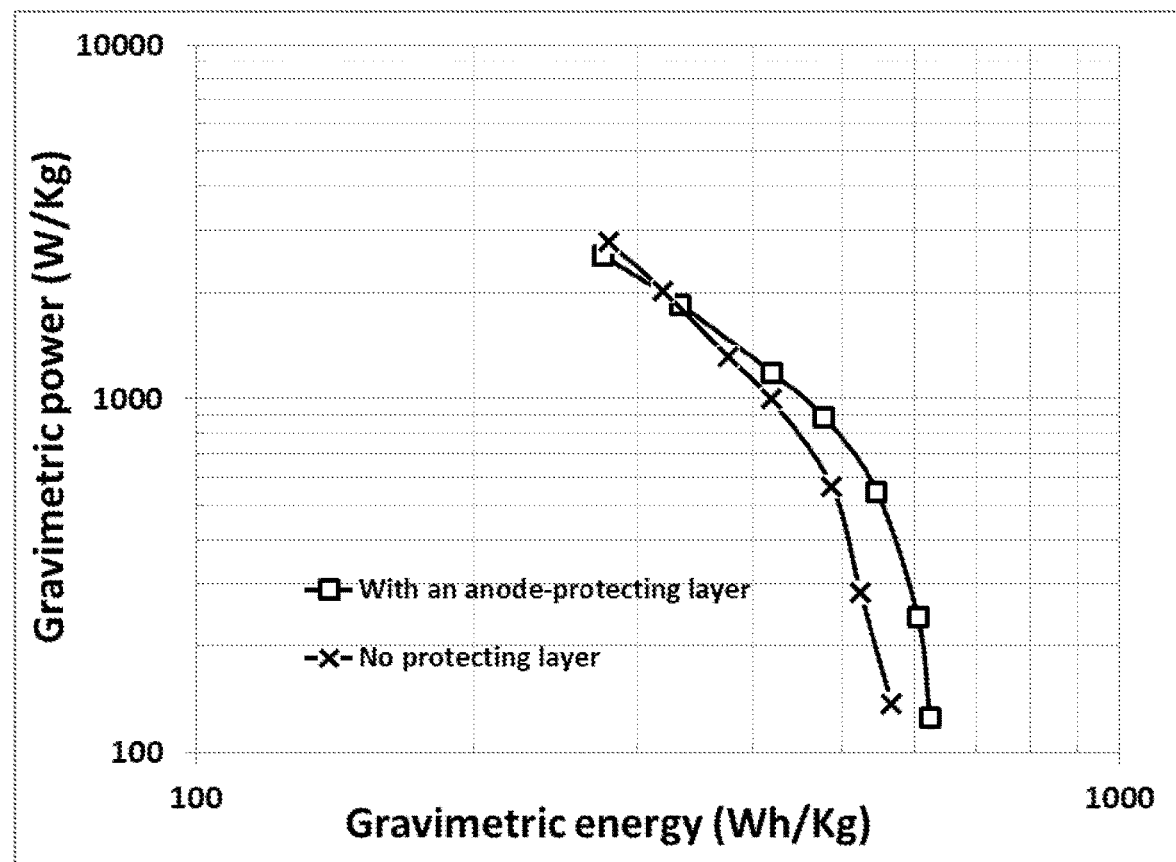
FIG. 6 Ragone plots (cell power density vs. cell energy density) of two Li metal-sulfur cells: one featuring a cathode-protecting layer composed of sulfonated elastomer composite and the other without a protecting layer. The cathode active material is reduced graphene oxide-embraced S particles.
Figure 7:
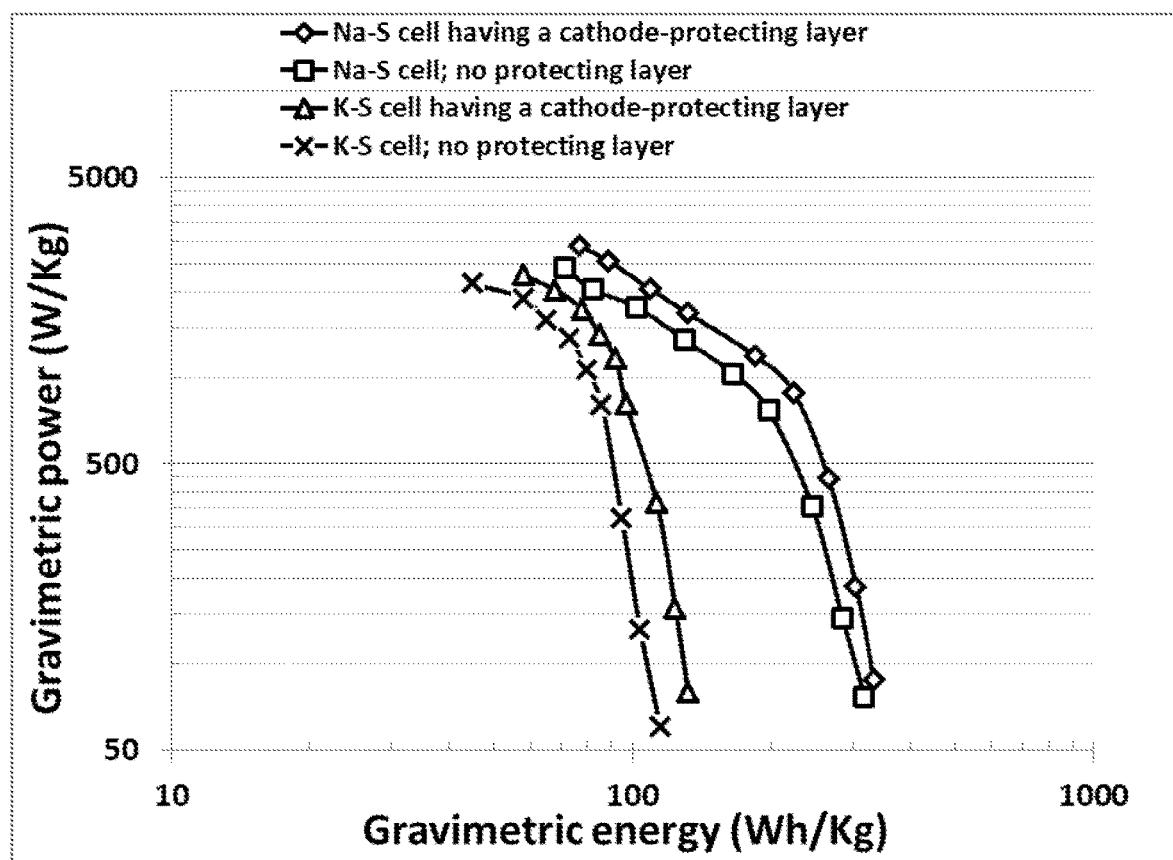
FIG. 7 Ragone plots (cell power density vs. cell energy density) of 4 alkali metal-sulfur cells each having a cathode active material layer containing particles of exfoliated graphite worms electrochemically impregnated with sulfur as the cathode active material: Na—S cell featuring a sulfonated elastomer composite-based cathode-protecting layer, Na—S cell without a protecting layer, K—S cell featuring a cathode-protecting layer, and K—S cell without a protecting layer.

FIG. 6 and FIG. 7 indicate that the presence of a sulfonated elastomer composite-based protecting layer does not compromise the energy density of an alkali metal-sulfur cell even though this composite shell is normally less electron-conducting than a carbon coating and less ion-conducting than a liquid electrolyte. Quite unexpectedly, the energy density of the cell is actually improved, defying the expectations of materials scientists.

In lithium battery industry, it is a common practice to define the cycle life of a battery as the number of charge-discharge cycles that the battery suffers 20% decay in capacity based on the initial capacity measured after the required electrochemical formation. Summarized in Table 2 below are the cycle life data of a broad array of batteries featuring presently invented sulfonated elastomer composite-encapsulated sulfur cathode particles vs. other types of cathode active materials.

TABLE 2

Cycle life data of various lithium-sulfur batteries.

| Sample ID | Type of sulfonated elastomer + 2% graphene or CNT | Type & % of active material | Initial capacity (mAh/g) | Cycle life (No. of cycles) |
|---|---|---|---|---|
| CNF-1 | Sulfonated PB encapsulation | 80% by wt. S + 7% CNF + 3% rotaxane + 5% binder + 5% CB | 1,265 | 1,550 |
| CNF-2 | Carbon encapsulation | 80% by wt. S + 7% CNF + 3% carbon + 5% binder + 5% CB | 1,280 | 165 |
| AC-1 | No encapsulation | 70% S + 15% AC + 8% binder + 7% CB | 1,258 | 155 |
| AC-2 | SBS (75%) + PEO (25%) | 70% S + 15% AC + 3% polymer mixture + 5% binder + 7% CB | 1,259 | 1,335 |
| Gn-3 | PU encapsulation | 90% S (coated on graphene sheets) | 1454 | 2,477 |
| Gn-4 | Carbon encapsulation | 90% S (coated on graphene sheets) | 1453 | 188 |
| CB-1 | No encapsulation | 70% S + 22% CB + 8% binder | 1020 | 47 |
| CB-2 | SIBS encapsulation | 70% S + 20% CB + 4% PEO + 6% binder | 1035 | 1315 |

The following observations can be made from the data of Table 2 and FIG. 3-FIG. 7:
1) The presently invented conductive sulfonated elastomer composite-based protective layer approach enables the Li—S, Na—S, and K—S batteries to deliver high cycling stability or long cycle life.
2) The invented approach also leads to alkali metal-sulfur batteries having exceptional energy densities and power densities. A cell-level energy density as high as 623 Wh/kg has been achieved with Li—S cells.
3) Similar advantageous features are also observed with Na—S cells and K—S cells. This is evidenced by FIG. 7, which shows the Ragone plots (cell power density vs. cell energy density) of 4 alkali metal-sulfur cells:

In summary, the present invention provides an innovative, versatile, and surprisingly effective platform materials technology that enables the design and manufacture of superior alkali metal-sulfur rechargeable batteries. The alkali metal-sulfur cell featuring a protective layer at the anode and/or the cathode side exhibits a high cathode active material utilization rate, high specific capacity, high specific energy, high power density, little or no shuttling effect, and long cycle life. When an anode-protecting layer implemented between the anode active material layer and the separator, the lithium dendrite issue is also suppressed or eliminated.

The invention claimed is:
1. A rechargeable alkali metal-sulfur cell selected from lithium-sulfur cell, sodium-sulfur cell, or potassium-sulfur cell, said alkali metal-sulfur cell comprising:
 (a) an anode active material layer and an optional anode current collector supporting said anode active material layer;
 (b) a cathode active material layer, comprising a sulfur-containing material selected from a sulfur-carbon hybrid, sulfur-graphite hybrid, sulfur-graphene hybrid, conducting polymer-sulfur hybrid, metal sulfide, sulfur compound, or a combination thereof, and an optional cathode current collector supporting said cathode active material layer;
 (c) an electrolyte and a porous separator layer; and
 (d) a discrete anode-protecting layer disposed between said anode active material layer and said porous separator and/or a discrete cathode-protecting layer disposed between the porous separator and the cathode active material layer;

wherein said anode-protecting layer or cathode-protecting layer comprises a conductive sulfonated elastomer composite having from 0.01% to 50% by weight of a conductive reinforcement material dispersed in a sulfonated elastomeric matrix material and said layer of conductive sulfonated elastomer composite has a thickness from 1 nm to 100 μm, a fully recoverable tensile strain from 2% to 500%, a lithium ion conductivity from $10^{-7}$ S/cm to $5 \times 10^{-2}$ S/cm, and an electrical conductivity from $10^{-7}$ S/cm to 100 S/cm when measured at room temperature.

2. The rechargeable alkali metal-sulfur cell of claim 1, wherein said conductive reinforcement material is selected from the group consisting of graphene sheets, carbon nanotubes, carbon nanofibers, metal nanowires, conductive polymer fibers, and combinations thereof.

3. The rechargeable alkali metal-sulfur cell of claim 1, wherein said sulfur-carbon hybrid, sulfur-graphite hybrid, sulfur-graphene hybrid, or conducting polymer-sulfur hybrid is a mixture, blend, composite, chemically or physically bonded entity of sulfur or sulfide with a carbon, graphite, graphene, or conducting polymer material.

4. The rechargeable alkali metal-sulfur cell of claim 1, wherein said sulfonated elastomeric matrix material comprises a material selected from a sulfonated version of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) elastomer, poly(ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, and combinations thereof.

5. The rechargeable alkali metal-sulfur cell of claim 1, wherein said graphene sheets are selected from the group consisting of pristine graphene, graphene oxide, reduced graphene oxide, graphene fluoride, graphene chloride, nitrogenated graphene, hydrogenated graphene, doped graphene, functionalized graphene, and combinations thereof.

6. The rechargeable alkali metal-sulfur cell of claim 1, wherein said graphene sheets comprise single-layer graphene or few-layer graphene, wherein said few-layer graphene is defined as a graphene platelet formed of less than 10 graphene planes.

7. The rechargeable alkali metal-sulfur cell of claim 1, wherein said graphene sheets have a length or width from 5 nm to 5 μm.

8. The rechargeable alkali metal-sulfur cell of claim 1, wherein said metal sulfide comprises $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

9. The rechargeable alkali metal-sulfur cell of claim 7, wherein said metal element M is selected from Li, Na, K, Mg, Zn, Cu, Ti, Ni, Co, Fe, or Al.

10. The rechargeable alkali metal-sulfur cell of claim 1, wherein said metal sulfide comprises $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S_1$, $K_2S_2$, $K_2S_3$, $K_2S_4$, $K_2S_5$, $K_2S_6$, $K_2S_7$, $K_2S_8$, $K_2S_9$, or $K_2S_{10}$.

11. The rechargeable alkali metal-sulfur cell of claim 1, wherein said carbon or graphite material in said cathode active material layer is selected from the group consisting of mesophase pitch, mesophase carbon, mesocarbon microbead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, and combinations thereof.

12. The rechargeable alkali metal-sulfur cell of claim 1, wherein said conducting polymer-sulfur hybrid comprises an intrinsically conductive polymer selected from polyaniline, polypyrrole, polythiophene, polyfuran, a bi-cyclic polymer, a sulfonated derivative thereof, or a combination thereof.

13. The rechargeable alkali metal-sulfur cell of claim 1, wherein said sulfonated elastomer matrix further comprises from 0.1% to 50% by weight of a lithium ion-conducting additive or sodium ion-conducting additive dispersed therein.

14. The rechargeable alkali metal-sulfur cell of claim 13, wherein said lithium ion-conducting additive is selected from the group consisting of $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, and combinations thereof, wherein X=F, Cl, I, or Br, R=a hydrocarbon group, $0<x\leq1$ and $1\leq y\leq4$.

15. The rechargeable alkali metal-sulfur cell of claim 13, wherein said lithium ion-conducting additive is dispersed in said ultrahigh molecular weight polymer and is selected from the group consisting of lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, and combinations thereof.

16. The rechargeable alkali metal-sulfur cell of claim 13, wherein said lithium ion-conducting polymer is selected from a lower molecular version of poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof, wherein said lower molecular version is defined as having a molecular weight less than 500,000 g/mole.

17. The rechargeable alkali metal-sulfur cell of claim 1, wherein said cell has a sulfur utilization efficiency from 80% to 99%.

18. The rechargeable alkali metal-sulfur cell of claim 1, wherein said electrolyte is selected from the group consisting of polymer electrolyte, polymer gel electrolyte, composite electrolyte, ionic liquid electrolyte, organic liquid electrolyte, solid-state electrolyte, and combination thereof.

19. The rechargeable alkali metal-sulfur cell of claim 1, wherein said electrolyte comprises a salt selected from the group consisting of lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate (LiCF$_3$SO$_3$), bis-trifluoromethyl sulfonylimide lithium (LiN(CF$_3$SO$_2$)$_2$, lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF3(CF$_2$CF$_3$)$_3$), lithium bisperfluoroethysulfonylimide (LiBETI), an ionic liquid salt, sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluorometasulfonate (KCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide potassium (KN(CF$_3$SO$_2$)$_2$), and combinations thereof.

20. The rechargeable alkali metal-sulfur cell of claim 1, wherein said electrolyte comprises a solvent selected from the group consisting of ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, room temperature ionic liquid, and combinations thereof.

21. The rechargeable alkali metal-sulfur cell of claim 1, wherein said anode active material layer comprises an anode active material selected from the group consisting of lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, Li$_4$Ti$_5$O$_{12}$, and combinations thereof.

22. The rechargeable alkali metal-sulfur cell of claim 1, wherein said cell is a lithium ion-sulfur cell and said anode active material layer comprises an anode active material selected from the group consisting of:
 (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe) and cadmium (Cd), and lithiated versions thereof;
 (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric;
 (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof;
 (d) salts and hydroxides of Sn and lithiated versions thereof;
 (e) carbon or graphite materials and prelithiated versions thereof; and
 combinations thereof.

23. The rechargeable alkali metal-sulfur cell of claim 1, wherein said cell is a sodium ion-sulfur cell or potassium ion-sulfur cell and said anode active material layer comprises an anode active material selected from the group consisting of:
 (a) sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
 (b) sodium- or potassium-containing alloys or intermetallic compounds of Si, Ge, Sn, Pb, Sb, Bi, Zn, Al, Ti, Co, Ni, Mn, Cd, and their mixtures;
 (c) sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof;
 (d) sodium or potassium salts;
 (e) particles of graphite, hard carbon, soft carbon or carbon particles and pre-sodiated versions thereof; and combinations thereof.

* * * * *